(12) United States Patent
Wegst et al.

(10) Patent No.: US 10,315,246 B2
(45) Date of Patent: Jun. 11, 2019

(54) SYSTEM AND METHOD FOR NUCLEAR REACTOR FUEL HAVING FREEZE-CAST MATRIX IMPREGNATED WITH NUCLEOTIDE-RICH MATERIAL

(71) Applicant: The Trustees of Dartmouth College, Hanover, NH (US)

(72) Inventors: Ulrike G. K. Wegst, Hanover, NH (US); Philipp Hunger, Pittsburgh, PA (US); Todd Allen, Idaho Falls, ID (US)

(73) Assignees: THE TRUSTEES OF DARTMOUTH COLLEGE, Hanover, NH (US); WISCONSIN ALUMNI RESEARCH FOUNDATION, Madison, WI (US)

( * ) Notice: Subject to any disclaimer, the term of this patent is extended or adjusted under 35 U.S.C. 154(b) by 1409 days.

(21) Appl. No.: 14/196,883

(22) Filed: Mar. 4, 2014

(65) Prior Publication Data

US 2019/0131021 A1    May 2, 2019

Related U.S. Application Data

(63) Continuation-in-part of application No. 13/984,235, filed as application No. PCT/US2012/024200 on Feb. 7, 2012, now abandoned.
(Continued)

(51) Int. Cl.
*G21C 3/62* (2006.01)
*B22D 25/00* (2006.01)
(Continued)

(52) U.S. Cl.
CPC ........... *B22D 15/00* (2013.01); *B22D 25/005* (2013.01); *B22F 3/10* (2013.01); *B22F 3/24* (2013.01);
(Continued)

(58) Field of Classification Search
None
See application file for complete search history.

(56) References Cited

U.S. PATENT DOCUMENTS

| | | | |
|---|---|---|---|
| 3,270,098 A | * | 8/1966 | Barr ..................... C01G 43/025 |
| | | | 252/635 |
| 6,451,059 B1 | | 9/2002 | Janas et al. |

(Continued)

FOREIGN PATENT DOCUMENTS

| JP | 2005-290493 A | 10/2005 |
|---|---|---|
| WO | 2005089127 A2 | 9/2005 |

OTHER PUBLICATIONS

U.S. Appl. No. 13/984,235 Office Action dated Feb. 12, 2016, 12 pages.
(Continued)

*Primary Examiner* — Colin W. Slifka
(74) *Attorney, Agent, or Firm* — Lathrop Gage LLP

(57) ABSTRACT

A multiphase composite, formed by freeze-casting, lyophilization, and sintering, has sintered particles forming a scaffold having at least one region of aligned porosity; and a second phase formed in pores of the scaffold. In a particular embodiment, the second phase is a nuclear fuel, in another, the first phase is a nuclear fuel, and in others, both phases are nuclear fuels. In some embodiments, the first phase is a ceramic, and in other embodiments a metal such as stainless steel. In other embodiments, the second phase is a metal, and in other embodiments a ceramic. In some embodiments the second phase is positioned in a subset of pores of the scaffold, at least some additional pores being filled with a third phase. In embodiments, the second phase is also sintered.

3 Claims, 34 Drawing Sheets

Related U.S. Application Data

(60) Provisional application No. 61/772,525, filed on Mar. 4, 2013, provisional application No. 61/440,695, filed on Feb. 8, 2011, provisional application No. 61/440,255, filed on Feb. 7, 2011.

(51) Int. Cl.

| | |
|---|---|
| *B22D 15/00* | (2006.01) |
| *G21C 21/02* | (2006.01) |
| *H01M 4/80* | (2006.01) |
| *C01G 43/025* | (2006.01) |
| *B22D 21/00* | (2006.01) |
| *C01G 43/00* | (2006.01) |
| *C08K 3/08* | (2006.01) |
| *C08K 3/22* | (2006.01) |
| *B22F 5/10* | (2006.01) |
| *B22F 3/10* | (2006.01) |
| *B22F 3/24* | (2006.01) |
| *H01M 4/04* | (2006.01) |
| *H01M 4/66* | (2006.01) |
| *H01M 4/02* | (2006.01) |

(52) U.S. Cl.
CPC ............. *B22F 5/10* (2013.01); *C01G 43/025* (2013.01); *G21C 3/623* (2013.01); *G21C 3/626* (2013.01); *G21C 21/02* (2013.01); *H01M 4/0485* (2013.01); *H01M 4/661* (2013.01); *H01M 4/801* (2013.01); *C01P 2004/34* (2013.01); *C01P 2004/50* (2013.01); *H01M 2004/021* (2013.01); *Y02E 30/38* (2013.01)

(56) References Cited

U.S. PATENT DOCUMENTS

| | | |
|---|---|---|
| 2007/0237799 A1 | 10/2007 | Scharnweber et al. |
| 2008/0275171 A1* | 11/2008 | Song ................. C08K 3/013 524/417 |
| 2010/0016989 A1 | 1/2010 | Petter et al. |
| 2010/0215899 A1 | 8/2010 | Mazumder et al. |
| 2011/0076734 A1 | 3/2011 | Zhou et al. |
| 2014/0158020 A1 | 6/2014 | Wegst et al. |

OTHER PUBLICATIONS

Byung-Ho Yoon (2008), "Aligned porous alumina ceramics with high compressive strengths for bone tissue engineering" Scripta Materialia 58: 537-540.

U.S. Appl. No. 13/984,235 Office Action dated Jul. 27, 2015, 13 pages.

International Search Report and Written Opinion in PCT/US2012/024200 dated Dec. 26, 2012, 8 pages.

\* cited by examiner

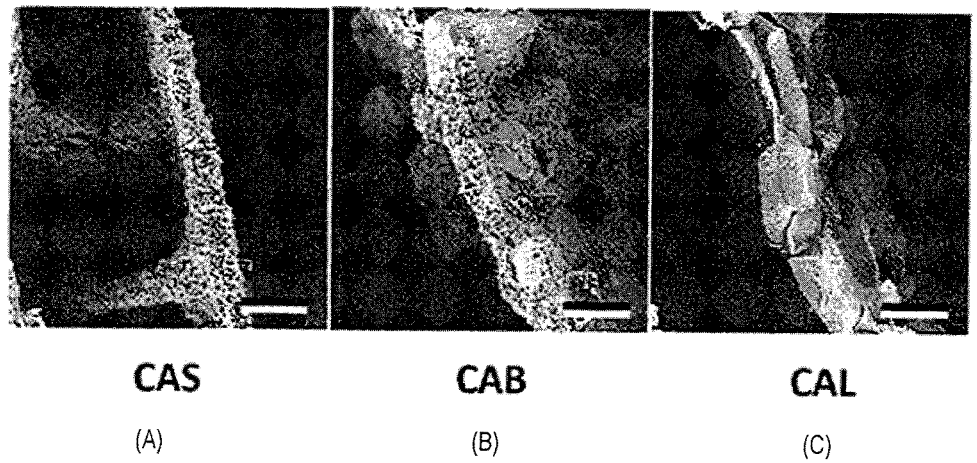
CAS  CAB  CAL
(A)    (B)    (C)
FIG. 9
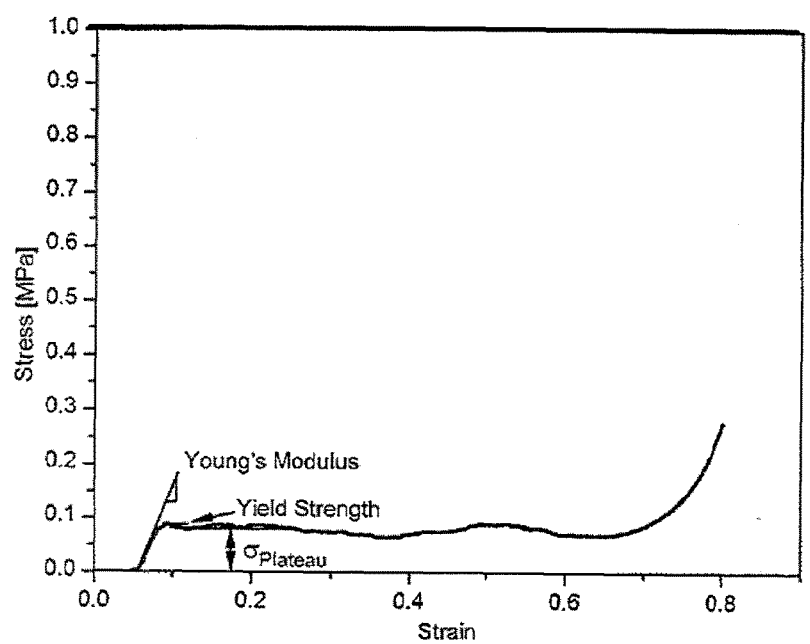
Brittle failure, no yielding  FIG. 10
CAS

Elastic/Plastic failure, yielding
CAL

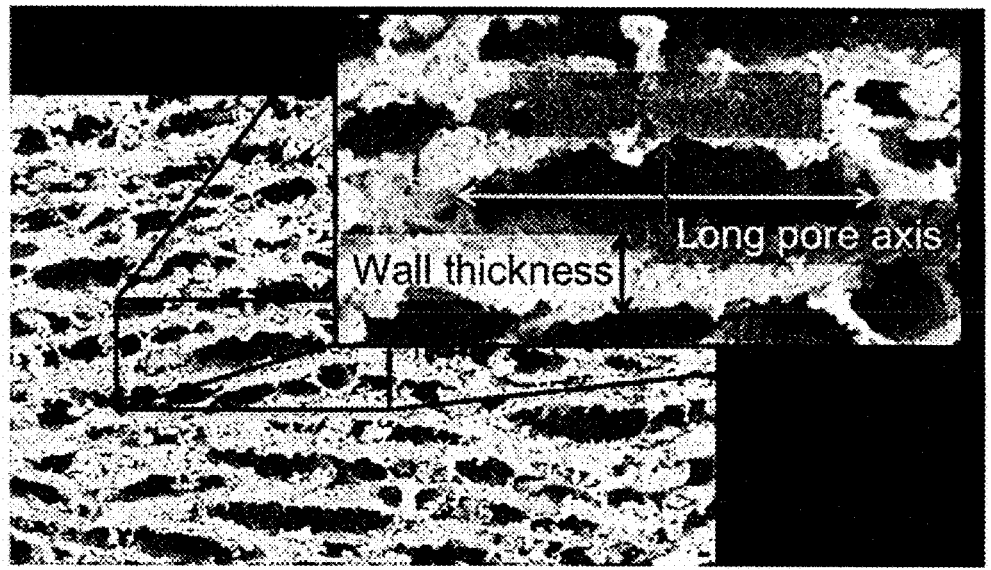
FIG. 14
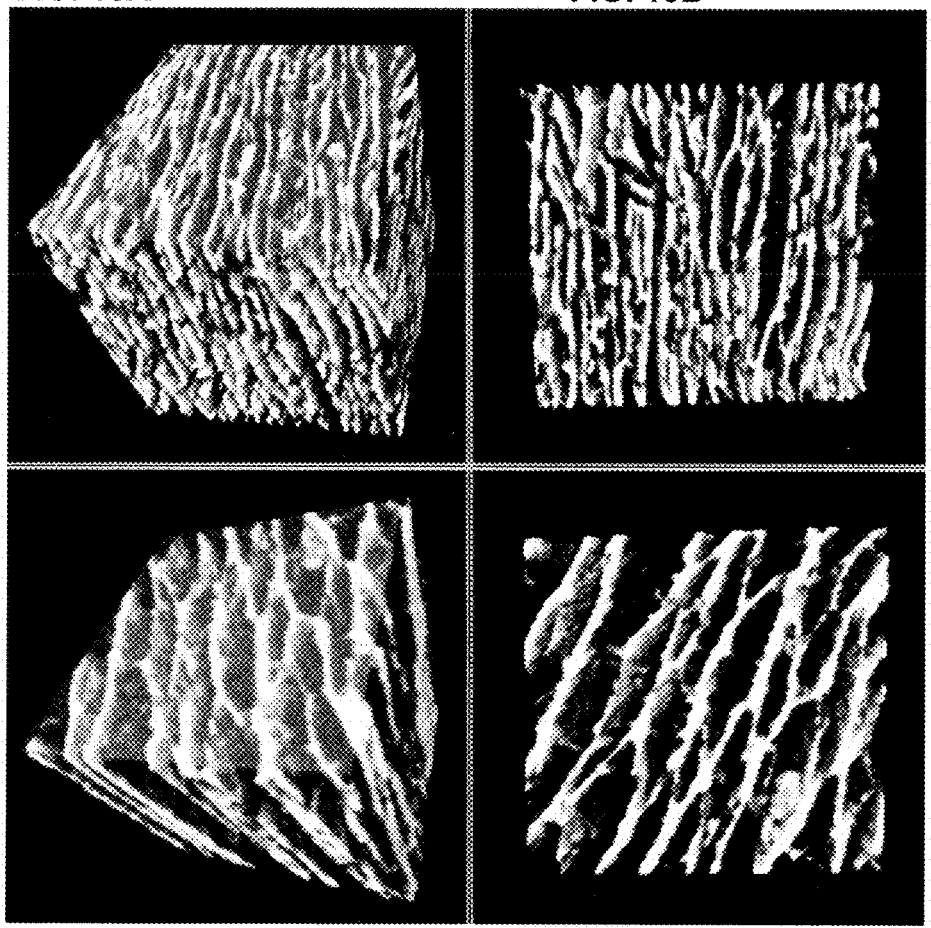
FIG. 15A  FIG. 15B
FIG. 15C  FIG. 15D

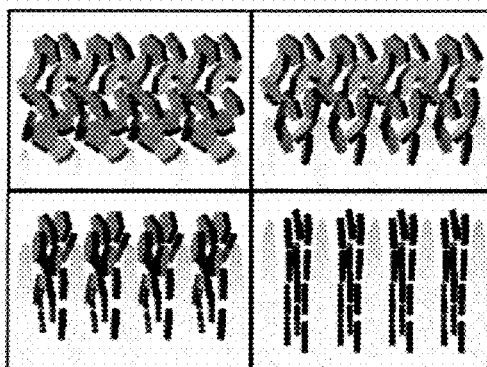
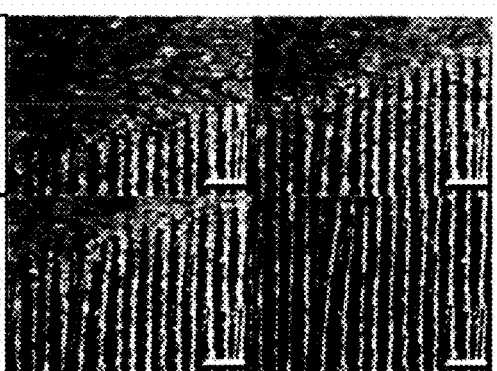
FIG. 23A  FIG. 23B
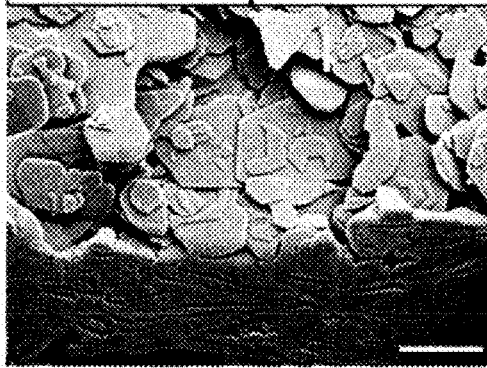
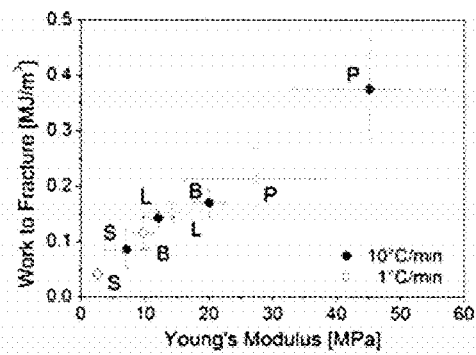
FIG. 23C  FIG. 23D

SYSTEM AND METHOD FOR NUCLEAR REACTOR FUEL HAVING FREEZE-CAST MATRIX IMPREGNATED WITH NUCLEOTIDE-RICH MATERIAL

CROSS-REFERENCE TO RELATED APPLICATIONS

This application claims priority to U.S. Provisional Patent Application 61/772,525, filed 4 Mar. 2013, the entire contents of which is incorporated herein by reference. This application is also a continuation-in-part of U.S. patent application Ser. No. 13/984,235 file Aug. 7, 2013, which is a 371 U.S. National Phase Application of PCT Patent Application Serial No. PCT/US12/24200 filed Feb. 7, 2012, which claims priority to U.S. Provisional Patent Application No. 61/440,695, filed Feb. 8, 2011, and U.S. Provisional Patent Application No. 61/440,255, filed on Feb. 7, 2011. The entire content of each of the above mentioned patent applications are incorporated herein by reference.

GOVERNMENT INTERESTS

This invention was made with government support under contract DE015633 awarded by National Institutes of Health and by contract DE-AC07-05ID14517(NEUP10-848) awarded by Department of Energy. The government has certain rights in the invention.

BACKGROUND OF THE INVENTION

Many applications such as filters, catalyst carriers or tissue scaffolds require highly porous, yet mechanically strong scaffolds whose micro- and nanoarchitectures can be carefully tailored. Because the introduction of porosity significantly lowers the mechanical properties of a material, it is difficult to achieve a successful compromise between porosity and mechanical performance. Furthermore, it is a great challenge to modify structure and mechanical performance independently.

Certain particles generated by some nuclear reactions in breeder and burner reactors, including alpha particles, have short range with desired energy in nuclear fuels. When these particles are desirable as reactants in additional reactions, is desirable to position nuclei that generate the particles at predetermined distances from the nuclei that are reactants in the additional reactions. It is therefore desirable to position particular isotopes in nuclear fuels with precision within particular portions of individual fuel rods, or pins, in order to promote desired nuclear reactions over less desirable reactions. Further, many nuclear reactions may generate gasses that can cause swelling of a rod or pin. It can therefore be desirable to have a porous central portion within a nuclear fuel rod or pin in order to vent these gasses.

In a typical fast reactor, pressurized water reactor (PWR) or boiling water reactor (BWR) fuel design, a 6-10 mm diameter fuel rod or pin has fuel pellets of 92-95% theoretical density surrounded by a 0.1 mm helium or sodium-filled gap and housed in a cladding tube of about 0.4 mm in thickness. Fuel rods or pins of similar dimensions used in other types of light-water reactors often have similar requirements and dimensions.

BRIEF SUMMARY

This disclosure advances the art and overcomes the problems outlined above by providing devices and methods for freeze casting of metal-polymer composites, ceramic-metal composites, metal-ceramic composites, ceramic-ceramic composites, ceramic-polymer composites and polymer-ceramic composites. Through freeze casting and by taking a biomimetic approach it is possible to create composite scaffolds whose mechanical properties and hierarchical architecture can be controlled over several orders of magnitude (stiffnesses and strengths from a few kPa to several tens of GPa) and at several length scales (from nanometers to about 1 centimeter).

A multiphase composite, formed by freeze-casting, forms and retains also after sintering, a scaffold architecture with at least one region of aligned porosity; a second phase can be introduced into the pores of the scaffold. In a particular embodiment, the second phase is a nuclear fuel. In some embodiments, the first phase is a ceramic, and in other embodiments a metal such as stainless steel; it could also be a nuclear fuel. In other embodiments, the second phase is a metal, and in other embodiments a ceramic. In some embodiments the second phase is positioned in a subset of pores of the scaffold, at least some additional pores being filled with a third phase. In embodiments, the second phase is also frequently sintered, either simultaneously with the scaffold or subsequently.

In an embodiment, a metal-polymer composite scaffold includes metal particles coupled with polymer binder, the scaffold having regions of aligned porosity with a gradient. In a particular embodiment, the metal particles include stainless steel. The metal particles have sizes equal to or smaller than 3 μm. In many embodiments, the scaffold's Young's modulus is below 10 GPa and the strength below 500 MPa. In a particular embodiment, the polymer binder includes chitosan, gelatin, and ethanol. In an alternative embodiment, the polymer binder has a zirconium acetate additive. The composite has post-sintering porosity of at least 60%.

In an embodiment, a ceramic-polymer composite includes alumina and polymer binder, the composite having regions of aligned porosity with a gradient. In a particular embodiment, the composite has a post-sintering porosity of at least 90%. The polymer binder includes chitosan and gelatin. The alumina is in a form of particles or platelets. The composite formed with the alumina in the form of platelets has less shrinkage and improved yield strength and Young's modulus than a ceramic-polymer composite formed with the alumina in the form of particles. The alumina particles have diameters in the range of a few hundred nanometers (nms). The alumina particles have diameters in the range of approximately 10 μm. The alumina particles include a first portion of particles with diameters in the range of a few hundred nms and a second portion of particles with diameters in the range of approximately 10 μm.

Additional embodiments and features are set forth in part in the description that follows, and in part would become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

FIG. 9 illustrates scanning electron micrographs of composite cell walls of hybrid scaffolds made from a) small particles b) bimodal particles c) large particles. Scale bar is 5 μm in an embodiment.

FIG. 10 is a representative compression curve for scaffolds made from small particles in an embodiment.

FIG. 14 is a SEM image indicating how the pore sizes and wall thicknesses were measured. in an embodiment FIGS. 15A-15D are four tomographic reconstructions of scaffolds S10 (FIG. 15A, FIG. 15B) and S10E (FIG. 15C, FIG. 15D). FIGS. 15A and 15C show a full 3D reconstruction of the scaffolds. The colored planes on the cubes shows a cross section perpendicular to the scaffold's freezing direction. FIGS. 15B and 15D show these cross sections in 2D. The cubes and cross sections had 1 mm side lengths in an embodiment.

FIG. 23A is a schematic showing the hypothesized platelet alignment during directional solidification in an embodiment.

FIG. 23B is a focused ion beam cut through an individual lamella showing the high degree of alignment of the platelets and the nacre-like arrangement within the composite walls in an embodiment.

FIG. 23C is a plot of toughness obtained with the different scaffold types plotted against the achieved Young's modulus in an embodiment.

FIG. 23D is a graph comparing the mechanical properties of the "cellular nacre" with scaffolds made from spherical particles.

DETAILED DESCRIPTION

Figure 1:
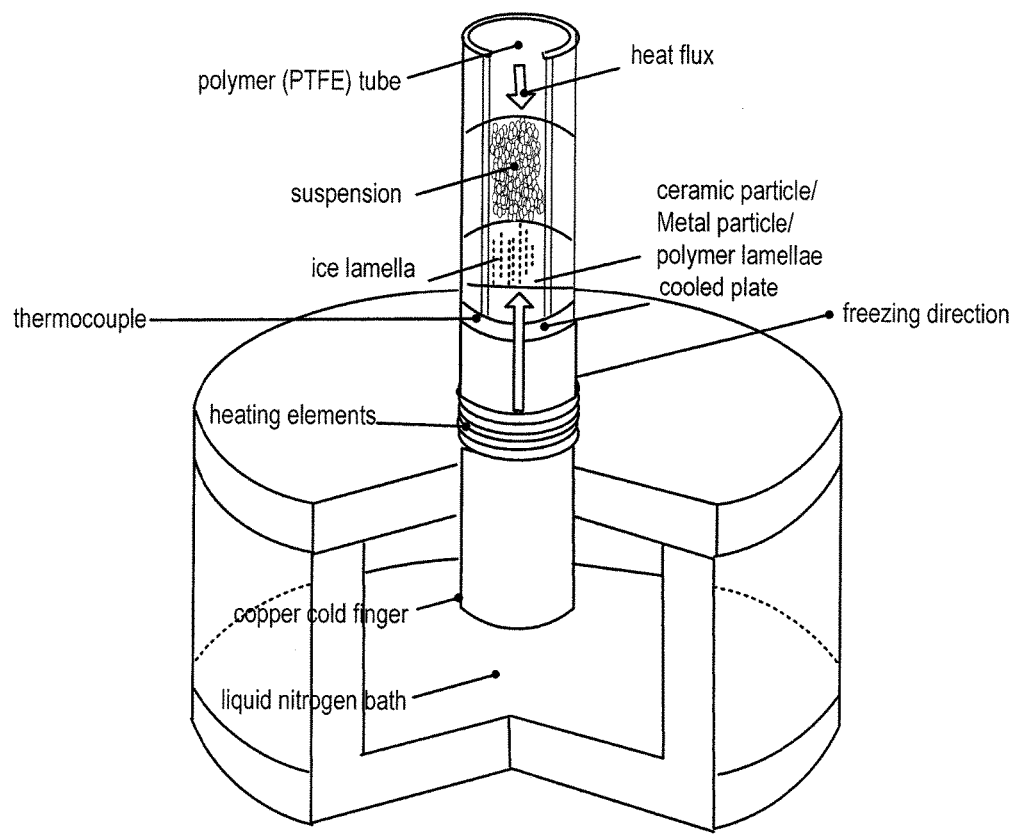
FIG. 1 is a schematic diagram of a freeze caster set up in an embodiment.

The present disclosure may be understood by reference to the following detailed description, taken in conjunction with the drawings as briefly described below. It is noted that, for purposes of illustrative clarity, certain elements in the drawings may not be drawn to scale.

Stainless Steel Scaffolds by Freeze Casting for Biomedical and Nuclear Applications Freeze casting is a processing technique that is based on the unidirectional freezing of a liquid carrier, either within a polymer solution or with particles (metal or ceramic) in suspension. In the past, literature has shown that commonly the freezing vehicle for freeze casting is water, although other carriers, such as camphene, have been used. Camphene is an attractive freezing vehicle because it has a freezing temperature of about 33° C., allowing camphene slurries to freeze at room temperature. It was found that by using water as opposed to camphene, unidirectional freezing could be carried out with greater control over the pore alignment. A particular freeze-casting device is shown in FIG. 1.

Slurry

Freeze casting process begins with the preparation of aqueous slurry. Though primarily water, the slurry also includes one or more polymers in solution, metal particles, or ceramic particles. A binder material is present in the slurry to provide additional strength to the green body freeze cast scaffold prior to sintering. Frequently, a dispersant is added to enhance particle dispersion within the slurry. The slurry is thoroughly mixed so that the particles are evenly dispersed throughout. It is usually also degassed directly before freezing and then it is transferred into an insulating mold, such as a cylindrical mold made of polytetrafluoroethylene (PTFE) with a conductive bottom. In an embodiment, the mold is placed onto a first end of a copper cold finger that has a second end submerged in a bath of liquid nitrogen. This creates a thermal gradient in the axial direction of the scaffold. As the slurry begins to freeze where it is in contact with the cold finger, ice crystals form on the bottom plate of the mold. Upon freezing, water diffuses out of the slurry and causes the ice crystals to grow. As the ice crystals form, the particles within the slurry are either accumulated between the ice crystals or pushed ahead by them or trapped within them, forming particle bridges between particle lamellae. The particles accumulated between ice crystals, and eventually trapped, form a green scaffold.

Since freeze casting initially involves an aqueous fluid with particles in suspension, particle sedimentation must be considered. A significant amount of particle sedimentation would result in a scaffold with an inhomogeneous structure with a density gradient, which could lead to inconsistent mechanical properties throughout the material. The rate of sedimentation is a function of the densities of the particle and its fluid carrier, the size of the particles, and the viscosity of the fluid. To calculate a particle's sedimentation velocity, Archimedes' principle and Stokes' law are applied.

Once the slurry has been prepared for the freezing process, it is poured into the mold. This mold is placed onto a copper rod that is submerged in a liquid nitrogen bath. The cooling rate of the copper cold finger is controlled by, for example, a ring heater around the copper rod and a thermocouple below the mold. The scaffold is frozen from the bottom to the top. In other embodiments, cooling systems of alternative designs are coupled to the copper cold finger.

Figure 2:
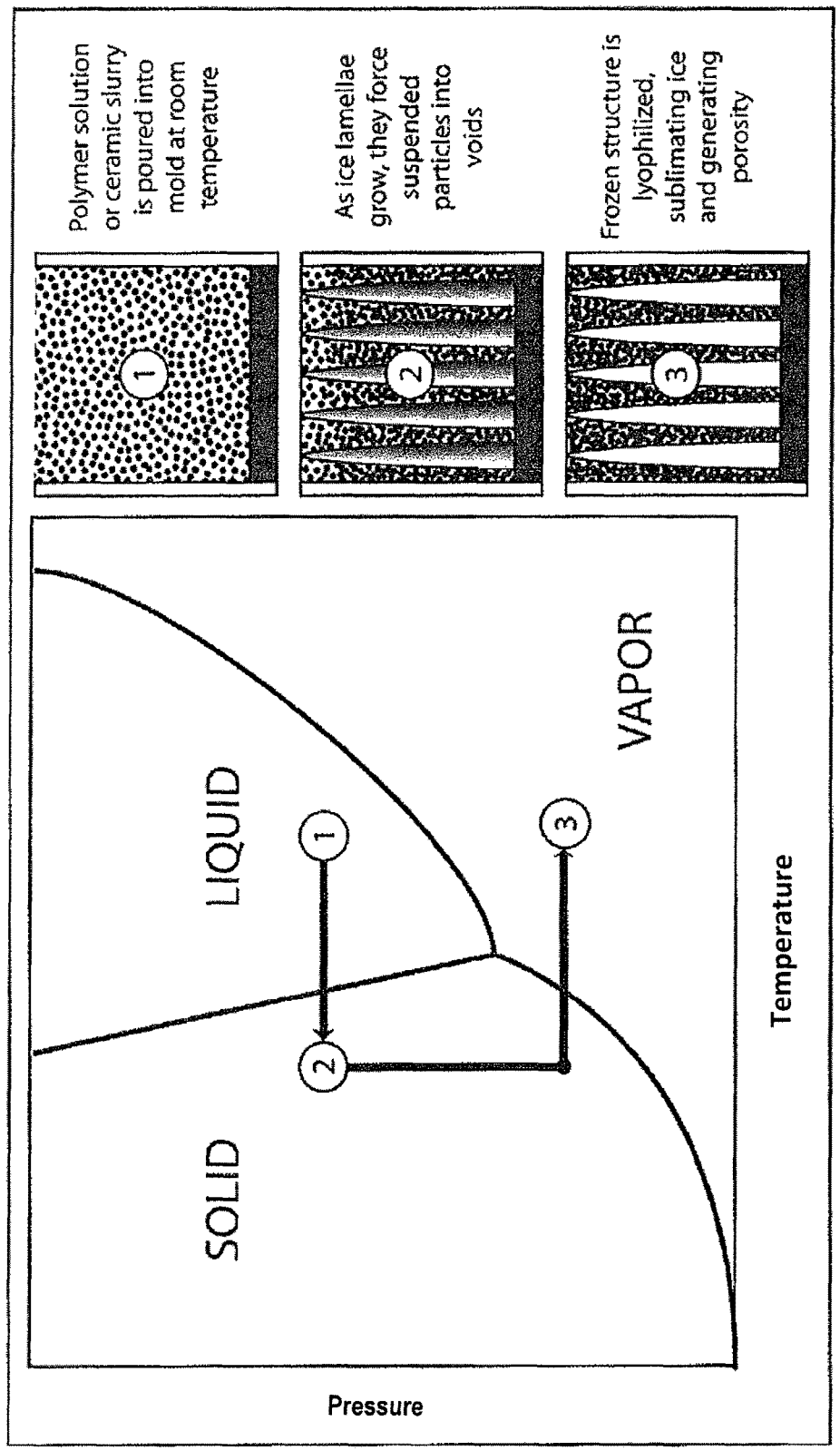
FIG. 2 is a P-T phase diagram of water with a path of freeze casting and freeze drying in an embodiment.
Figure 3:
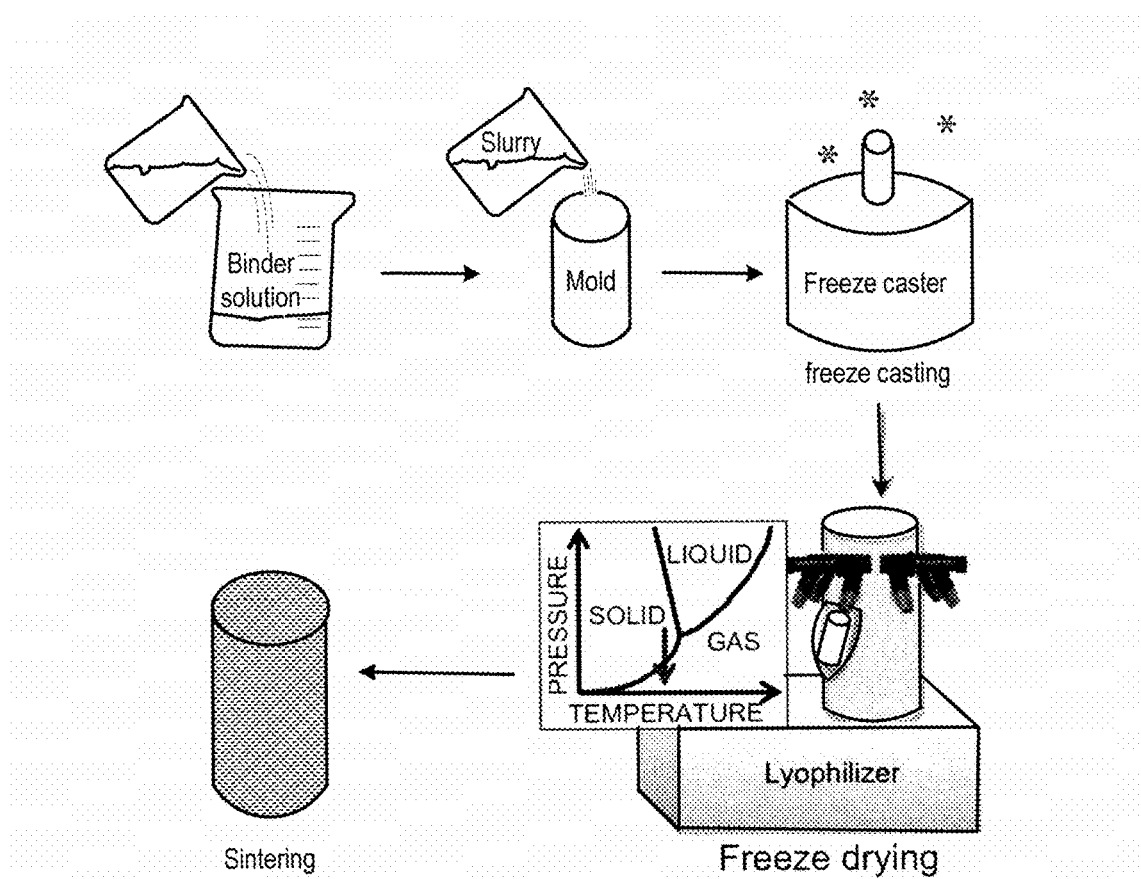
FIG. 3 is a schematic flow chart of a freeze casting process in an embodiment.

Once the scaffold is completely frozen, it is removed from the mold in which it was frozen and lyophilized (freeze-dried). Initially, in the freeze casting process, the scaffold is in liquid form. From this state, the scaffold is directionally frozen. After freezing, the scaffold is lyophilized. These phase transitions are shown in FIG. 2. During lyophilization, the ice lamellae transition directly from the solid to the gaseous phase as the scaffold is exposed to low pressure vacuum while frozen. Once the ice is removed and the scaffold is entirely dried, a green, porous, scaffold with aligned elongated pores remains with an elongated, aligned pore structure imposed by the ice. At this point, the scaffold is still in its green form and must be sintered. This is the final step of the freeze casting process, summarized in FIG. 3. In sintering, a green body is heated to a temperature where its particles fuse together, which may be a temperature that is approximately ⅘ its melting temperature.

Sintering greatly increases certain mechanical properties of ceramic and metal freeze-cast scaffolds. These properties are, in this case, influenced by the cell wall material properties and the cell wall and foam or honeycomb microstructure acquired after sintering. During sintering, the lamellae within the freeze-cast scaffold, composed of a packing of fine particles with fine pores, undergo densification and grain growth. The extent of densification and grain growth is controlled by the rate of heating during sintering, sintering time, and final sintering temperature. As far as mechanical properties are concerned, densification of metals is correlated with an increase in strength and an increase in grain size is linked to a decrease in strength and an increase in ductility.

Sintering can be carried out with pressure or without pressure. Sintering under pressure achieves greater densification. However, freeze cast scaffolds are sintered without applying pressure to preserve the deliberate aligned porosity produced within the scaffold. Upon sintering, it is expected that the particles fuse together so densification occurs within the lamellae. It is anticipated that little change occurs regarding densification within the aligned, elongated pores. This is because the pore widths are significantly larger than the size of the particles.

During the sintering process, it is critical to completely burn off the organic binder prior to reaching the stage where the particles begin to fuse together. Binder removal can be achieved by heating the scaffold at a low temperature that is just high enough to burn off the binder, before raising the temperature to sinter the particles. Another method is to use a low-rate heating ramp rate to allow enough time for the binder to slowly burn off before the sintering temperature is reached. If the particles fuse together before the binder is sufficiently removed, pockets can form trapping the binder material within the scaffold.

Figure 4A:
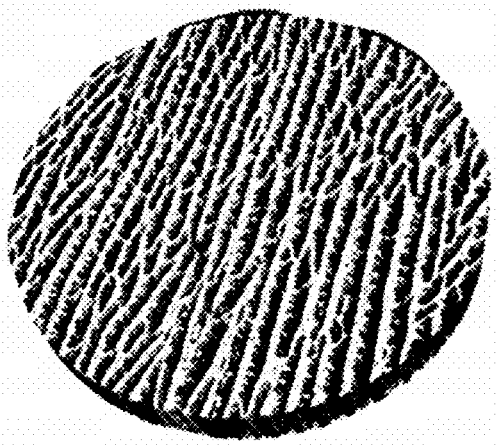
FIGS. 4a and 4b are X-ray tomographic reconstructions of a freeze cast ceramic composite scaffold with a diameter of 0.6 mm., formed in certain embodiments using a freezing rate: 20° C./min (a) and 5° C./min (b).
Figure 4B:
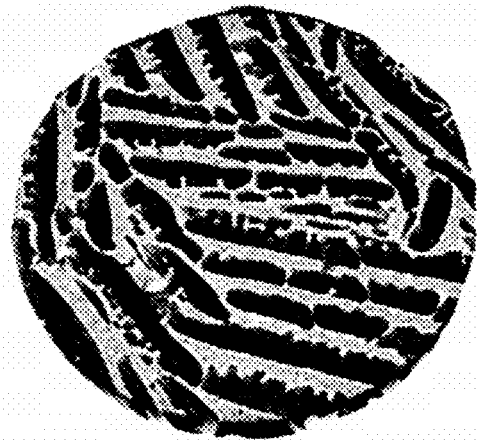

FIG. 4 is an X-ray tomographic reconstruction of a freeze cast ceramic composite scaffold with a diameter of 0.6 mm.

Figure 5:
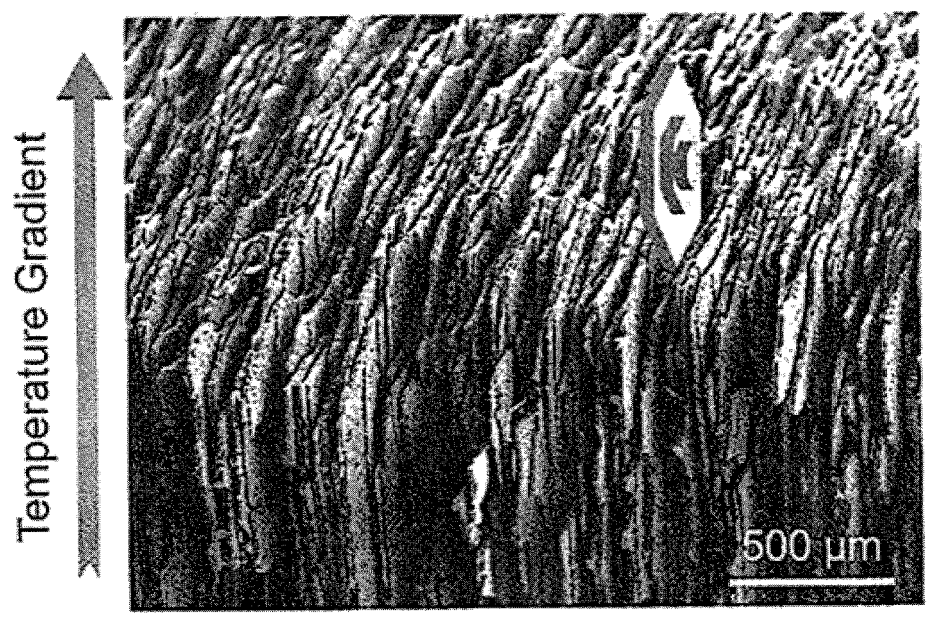
FIG. 5 is a SEM image illustrating anisotropic growth of lamellar ice in an embodiment.
Figure 6:
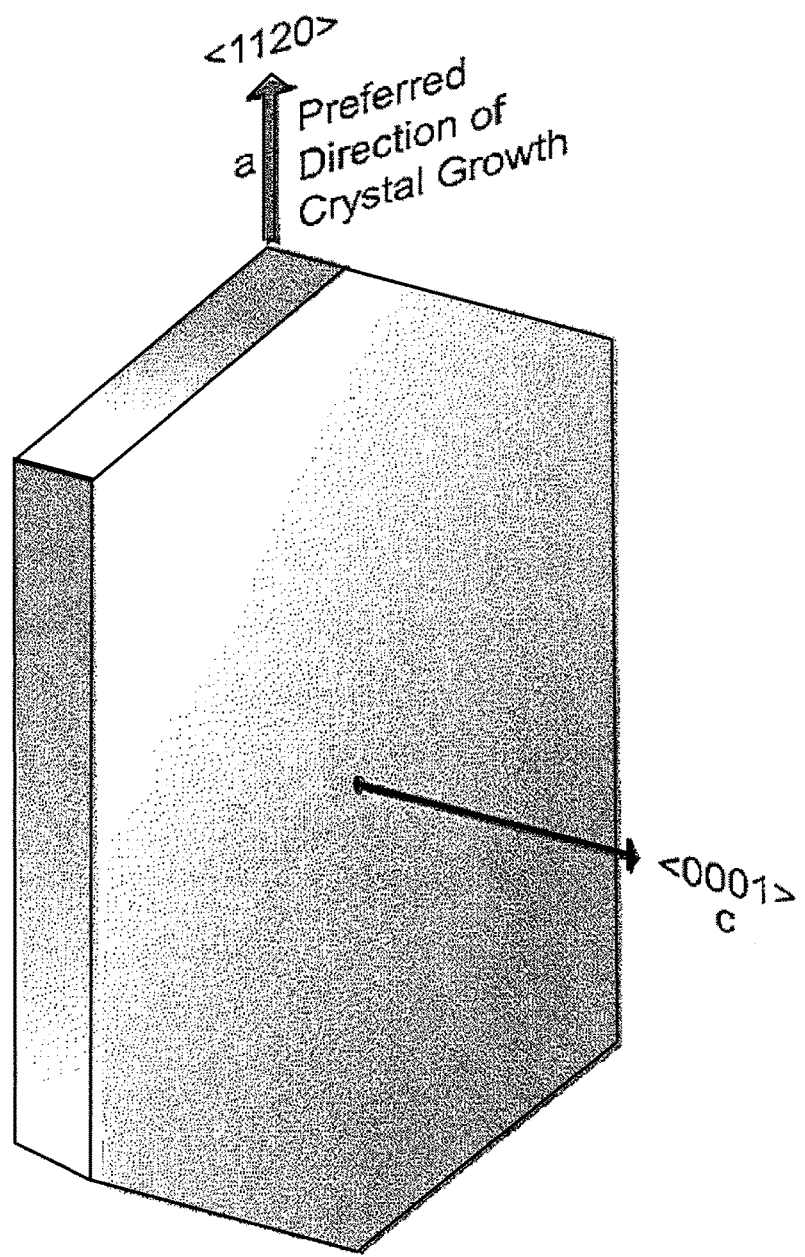
FIG. 6 is a simplified diagram illustrating lamellar crystals with their c-axis (<0001>) growing along a-axis (<1120>) in an embodiment.

Freezing rate: 20° C./min (a) and 5° C./min (b) in an embodiment. FIG. 5 is a SEM image illustrating anisotropic growth of lamellar ice in an embodiment. FIG. 6 is a simplified diagram illustrating lamellar crystals with their c-axis (<0001>) growing along a-axis (<1120>) in an embodiment.

Figure 7:
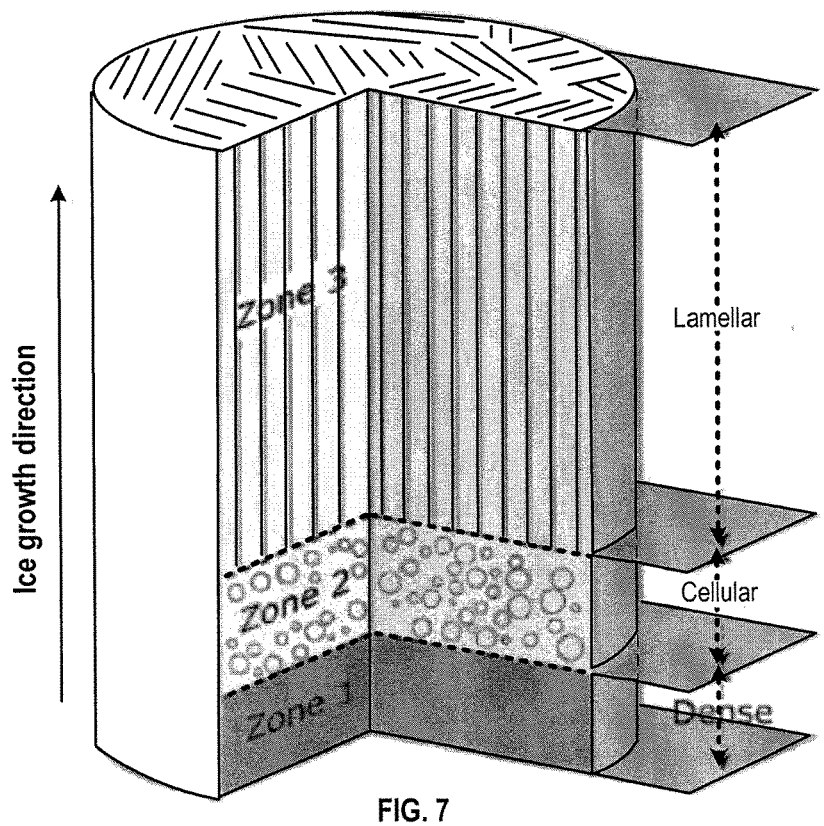
FIG. 7 is a schematic representation of the general microstructure of porosity within a freeze cast scaffold in an embodiment.

When studying the morphology of a freeze-cast scaffold, three distinct regions of different microstructures can be identified (FIG. 7). The three zones are characterized by the shape and dimensions of their pores. These different pore regions can be described as dense, cellular, and lamellar, respectively. Zone 1 is the region that is closest to the cold finger. It is a dense zone with no porosity. Located above this dense region is a transition into Zone 2, which is characterized by its closed cellular porosity. In Zone 3, another transition occurs where a lamellar microstructure is achieved. This region, the main area of interest, consists of elongated pores, aligned parallel to the freezing direction.

Faster freezing rates result in smaller lamellar thickness and slower freezing rates increase lamellar width. This is because higher freezing front velocities cause the ice lamellae to grow faster in the direction of the thermal gradient, restricting the growth of lamellae in the direction parallel to the freezing front and resulting in thinner lamellae.

The following materials were used, including 316L stainless steel powder, $d_{50}$=3 µm (EpsonAtmix Corporation, Hachinohe, Japan), low molecular weight chitosan powder, stored at 6° C. (Sigma-Aldrich, St. Louis, Mo.), Bioreagent Type B gelatin powder (Sigma-Aldrich, St. Louis, Mo.) and Glacial acetic acid (VWR International, West Chester, Pa.).

Polymer solution was prepared. The polymer solution used to suspend the metal particles consisted of a combination of chitosan and gelatin dissolved in 1% acetic acid. It was found that chitosan offered a higher viscosity to suspend the particles in when compared to gelatin. However, it was shown that the addition of gelatin allowed for better mechanical properties in the scaffold's green body form after lyophilization. Furthermore, it was found that the combination of chitosan and gelatin in the 63/37 wt. % ratio resulted in the most homogenous final geometry after freeze-drying of the various chitosan-gelatin ratios (50/50, 25/75, 75/25, 63/37 wt. %) that were tested.

To prepare the solution, 2.4 g of low molecular weight chitosan powder was weighed out on a high precision balance (±0.01 mg, XP105 Delta Range, Mettler Toledo Inc., Columbus, Ohio) and then transferred in a jar with 100 ml of 1 vol. % acetic acid to produce a 2.4% (weight/volume or w/v) chitosan solution. This was mixed on a Wheaton bench top roller apparatus with a rotational speed of 10 rpm for a minimum of 24 hours to ensure that the chitosan powder was completely dissolved and mixed into the acetic acid. To make the gelatin portion of the solution, 5.5 g of gelatin powder were weighed out and transferred into a beaker with 100 ml of 1 vol. % acetic acid to produce a 5.5% (w/v) gelatin solution. A PTFE coated magnetic stir bar was inserted into the mixture and it was stirred on a hot plate stirrer at 60 rpm for 12 hours at a temperature of 35° C.

Slurries were prepared by mixing together constituents according to Table 1A. Once all of the components of the slurry were measured and transferred into a mixing cup, the slurry was mixed and degassed in a high shear SpeedMixer (DAC 150 FVZ-K, FlackTek, Landrum, S.C.) at a speed of 2000 rpm for 60 seconds.

TABLE 1A

VARIOUS SLURRY FORMULATIONS

| Scaffold | TiH2/316L SS | 2.4% Chitosan solution | 5.5% Gelatin solution | Ethanol |
|---|---|---|---|---|
| S5 | 5 vol % | 76 vol % | 19 vol % | — |
| S10 | 10 vol % | 72 vol % | 18 vol % | — |
| S10E | 10 vol % | 64.8 vol % | 16.2 vol % | 9 vol % |
| S30 | 30 vol % | 56 vol % | 14 vol % | |

TABLE 3

DETAILS OF COMPOSITION, PROCESSING CONDITION AND RELATIVE DENSITY OF THE SCAFFOLDS

| Solid content | Cooling rate (° C./min) | Additives | Processing condition | Overall porosity (%) |
|---|---|---|---|---|
| 316L stainless steel 15 vol. % | −1 | — | Freeze-dried | 79.1 ± 0.3 |
| | | | Sintered | 62.8 ± 0.2 |
| | | 80 g/L ZRA | Freeze-dried | 74.4 ± 0.1 |
| | | | Sintered | 63.4 ± 0.2 |
| | −6 | — | Freeze-dried | 78.7 ± 0.1 |
| | | | Sintered | 61.4 ± 0.2 |
| | | 80 g/L ZRA | Freeze-dried | 74.0 ± 0.1 |
| | | | Sintered | 62.5 ± 0.2 |

Since there was a significant difference in the densities of the particles and polymer solution, it was expected that sedimentation would occur. The effects of sedimentation could cause a gradient in the composition, resulting in different mechanical properties along the height of the scaffold.

Following the freezing process, the scaffold was freeze dried. The completely frozen scaffold was first removed from the copper cold finger by hand and then demolded using an arbor press with a wooden punch. The scaffold was then transferred to a FreeZone 4.5 Liter Benchtop Freeze Dry System (Labconco, Kansas City, Mo.), where it was held at 0.180 mBar for at least 48 hours for the ice phase to sublime, with the cold trap held at −52 C.

Sintering temperatures were at 1100° C., 1150° C., and 1175° C. It was determined that 1150° C. was an adequate temperature for the sintering of the 316L stainless steel scaffolds. The process began at room temperature and then the temperature rose at a rate of 5° C./minute until it reached 400° C., where it was held for two hours in a vacuum of $10^{-6}$ torr to remove all of the organic binder material. After this step, in a second stage, the temperature was increased, at a ramp rate of 7° C./minute, to the sintering temperature of 1150° C., where it was held for two hours before it was returned to room temperature at the same rate. During this second stage, at which sintering occurred, the scaffolds were removed from vacuum and subjected to a reducing atmosphere of argon with 4% hydrogen (Ar about 4% $H_2$).

Once sintered, the scaffolds were sectioned into different shapes and sizes for mechanical and structural characterization. Scaffolds were mechanically tested to determine the yield strength and Young's modulus of the scaffold. Additionally, the scaffolds were structurally characterized to evaluate the structure-property correlations.

Sectioned cubes of the scaffolds were tested in compression using an MTS 793 material testing system (MTS Systems Corp., Eden Prairie, Minn.) with a 5 kN load cell and a cross head speed of 0.025 mm/s, corresponding to a strain rate of $10^{-3}$/s. The scaffolds were compressed in a direction parallel to the temperature gradient during freezing; in some embodiments, the scaffolds were also compressed in a direction perpendicular to the temperature gradient. To provide a frictionless surface for the scaffolds, the compression platens were covered in PTFE tape prior to each compression test.

A Low Speed Sectioning Saw (Buehler, A Division of Illinois Tool Works, Inc., Lake Bluff, Ill.) was used to cut sintered samples. Cutting operations were performed using a rubber bonded SiC sectioning blade (Allied High Tech Products, Inc., Rancho Dominguez, Calif.) with lubricant (Allied High Tech Products, Inc., Rancho Dominguez, Calif.). For mechanical testing, cubes with side lengths of 4 mm were cut at three standard heights, measured from the bottom of the sample at 4, 12.5 and 21 mm, respectively. To obtain reliable results, at least three samples in each layer were needed for mechanical testing. To test the thermal conductivity parallel to freeze direction, squares sample with side lengths of 4 mm and thickness of 2.3 mm were cut at three standard heights, measured from the bottom of the sample at 8.5, 17 and 25.5 mm, respectively. To test the thermal conductivity perpendicular to freeze direction, squares sample with side lengths of 4 mm and thickness of 2.3 mm were cut at three standard heights, measured from the bottom of the sample at 4, 12 and 20 mm, respectively.

The mechanical testing has been done to measure the yield strength and Young's modulus of freezing-cast samples. The sectioned cubes were tested in compression using an Instron 4469 testing system (Instron inc., Norwood, Mass.) with a 50 kN load cell and a cross head speed of 0.025 mm/s, corresponding to a strain rate of $10^{-3}$/s. The samples were compressed parallel to and perpendicular to freeze direction. To provide a frictionless surface for the samples, the compression platens were covered in G-N Metal Assembly Paste to each compression test. The working hardening rate of 316L stainless steel increased dramatically with the increasing of strain rate. Thus, a relatively slow strain rate of $10^{-3}$/s was chosen in the test to lower the influence of working hardening as much as possible [28].

To determine the overall porosity of the freeze-cast scaffold, the scaffolds were weighed on a high precision balance (±0.01 mg, XP105 Delta Range, Mettler Toledo Inc., Columbus, Ohio) and their dimensions were measured with calipers (±0.02 mm, Series 500 Absolute Digimatic Caliper, Mitutoyo America Corp, Aurora, Ill.) prior to sectioning.

Figures 12A, 12B, 12C:
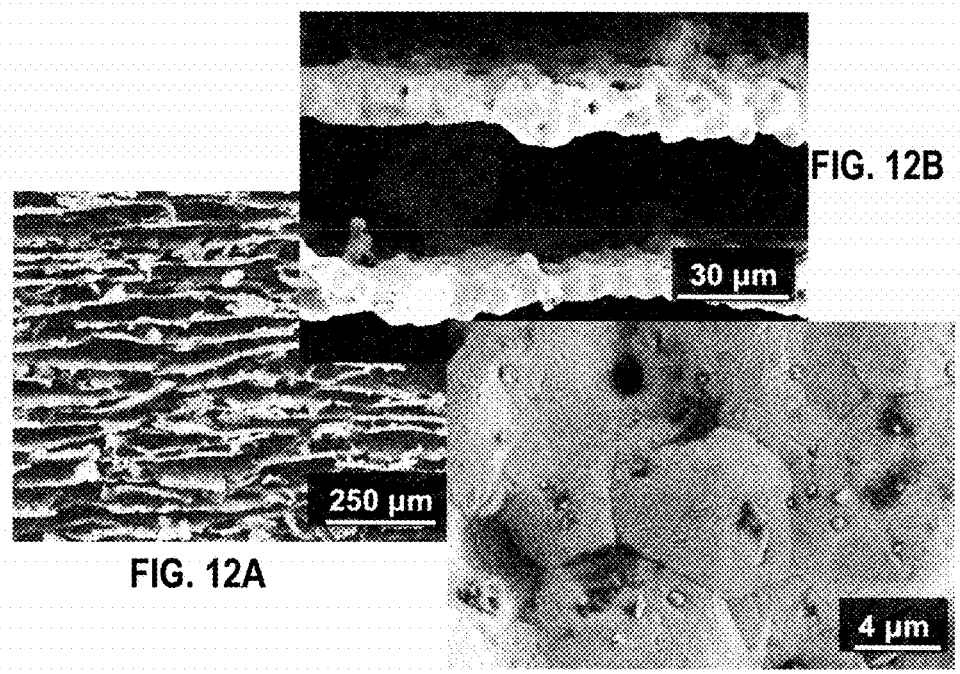
FIGS. 12A-12C are three SEM images of 316L stainless steel scaffolds from the third sintering trial at 1150° C. in an embodiment.
Figure 13A:
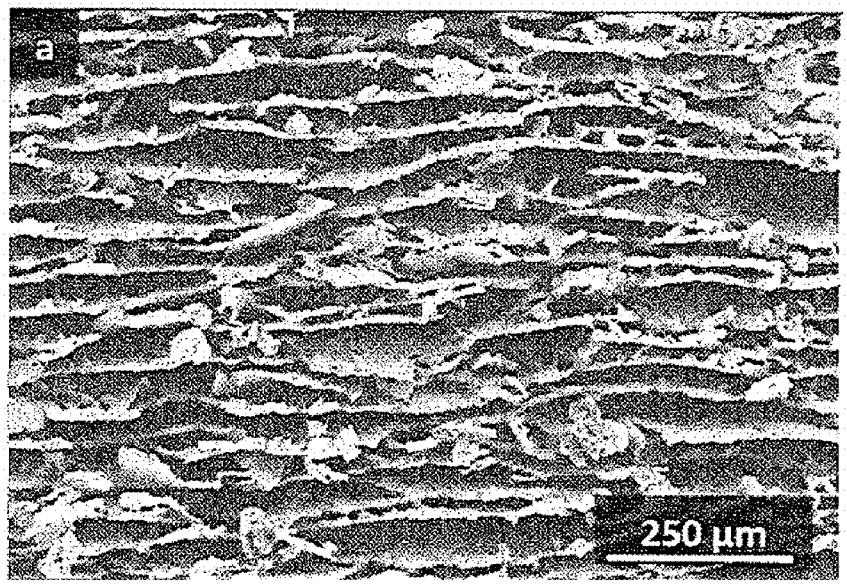
FIGS. 13A and 13B illustrate two SEM images of cross sections (perpendicular to the freezing direction) from scaffolds S10 (FIG. 15A) and S10E (FIG. 15B) in an embodiment.
Figure 13B:
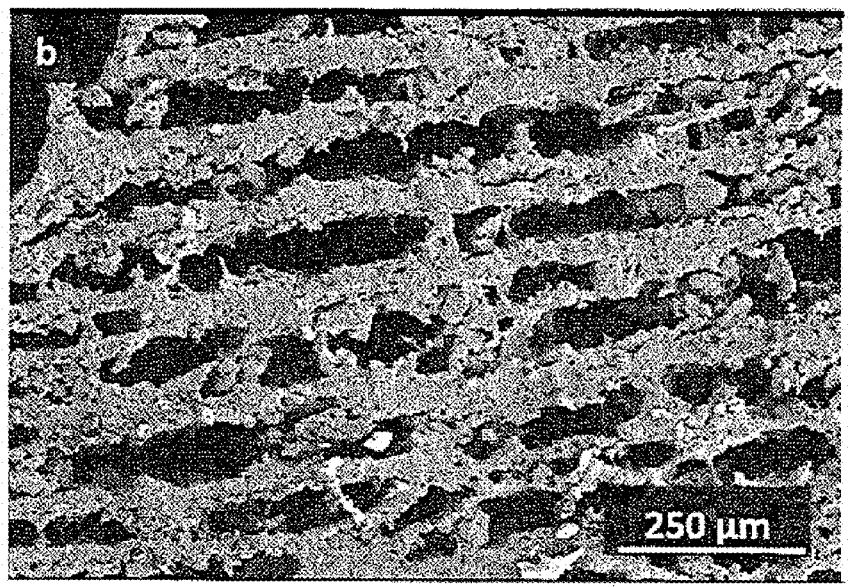

The microstructure was analyzed using SEM images taken with a Zeiss Supra 50VP, (Carl Zeiss SMT Inc., Peabody, Mass., USA) at accelerating voltages between 2 and 10 kV. To determine pore dimensions and wall thicknesses, imaging software (ImageJ, U. S. National Institutes of Health, Bethesda, Md.) was used to take measurements and to calculate mean values and standard deviations. FIGS. 12A-C are three SEM images of 316L stainless steel scaffolds from the third sintering trial at 1150° C. in an embodiment. FIGS. 13A-B are SEM images of cross sections (perpendicular to the freezing direction) from scaffolds S10 (a) and S10E (b) in an embodiment.

Further microstructural analysis was carried out by X-ray tomography using a high-resolution micro-computed tomography scanner (SkyScan1172, Kontich, Belgium). Scaffolds (1 mm cubes) of different compositions were scanned with a nominal pixel resolution of 0.7 μm. Each scan was reconstructed using SkyScan's volumetric reconstruction software, nRecon. The acquired and reconstructed dataset of .tif image stacks was visualized 3-dimensionally using VGStudio Max image analysis software (VGStudio Max 2.0, Volume Graphics GmbH, Heidelberg, Germany). The synchrotron X-ray tomography of the scaffolds was performed at the APS 32-ID-C beam line of Argonne National Laboratory (ANL) using the beam energy of 34 key. The pixel size was 2180*2014 and each pixel was 0.67 μm. The synchrotron X-ray tomography of the cell wall structure of the scaffolds was performed at beam line of X8C at the Brookhaven National Laboratory (BNL) using the beam energy of 5 key. The samples for the tomography were cut with a FIB system at the Center for Functional Nanomaterials in BNL using beam current of 21 nA at an acceleration voltage of 30 key.

Figure 16:
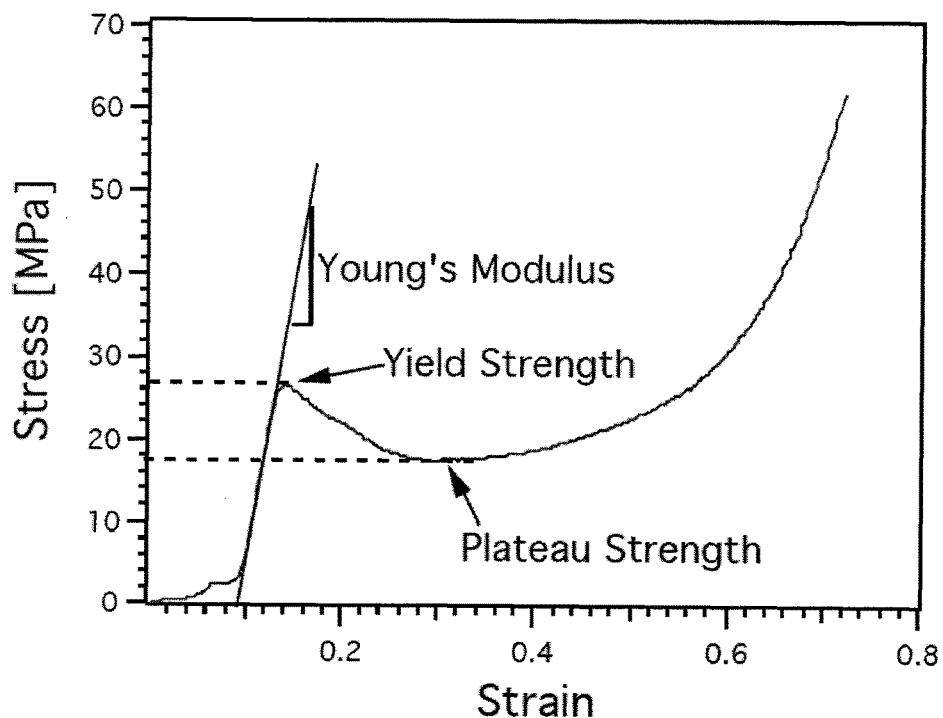
FIG. 16 is a typical compressive stress-strain curve for a 316L stainless steel freeze cast scaffold in an embodiment.

To determine mechanical properties of the freeze-cast stainless steel in dependence of their composition, freeze-cast scaffolds of three different compositions S5, S10, and S10E (all frozen at 1° C./minute) were tested in compression. From the stress-strain curves, Young's modulus, yield strength, and plateau strength were determined. A typical stress-strain curve for a scaffold is shown in FIG. 16, indicating how the mechanical properties were determined.

The mechanical properties of the three scaffolds are listed in Table 1B. Relative density is density of the porous material divided by the density of the solid from which it is made. For example, stainless steel foam has an 80% porosity, which translates to a relative density of 0.8.

Porosity=1−(relative density)=1−[(density of cellular solid)/(density from which cellular solid is made)]. It was found, as expected, that the scaffold (S5), with the lowest relative density of 0.168 and the lowest amount of steel loading (5 vol %), had both the lowest Young's modulus and yield strength, with 137±13.6 MPa and 8±0.5 MPa, respectively. Surprisingly, scaffolds S10 and S10E, with the same amount of steel loading (10 vol %), showed greatly differing mechanical properties. Comparing scaffold S10 to S10E, values ranged from 415±96.8 to 941±147 MPa for Young's modulus, and 14±2.1 to 32±3.5 MPa for yield strength.

TABLE 1B

MECHANICAL PROPERTIES OF 316L STAINLESS STEEL SCAFFOLDS

| Scaffold | Relative density | Young's modulus [MPa] | Yield strength [MPa] | Plateau strength [MPa] |
| --- | --- | --- | --- | --- |
| S5 | 0.168 ± 0.007 | 137.42 ± 13.58 | 8.58 ± 0.51 | 8.58 ± 0.51 |
| S10 | 0.215 ± 0.005 | 415.13 ± 96.75 | 13.94 ± 2.10 | 10.68 ± 1.74 |
| S10E | 0.281 ± 0.012 | 941.38 ± 147.51 | 32.77 ± 3.45 | 19.47 ± 4.03 |

Figure 17:
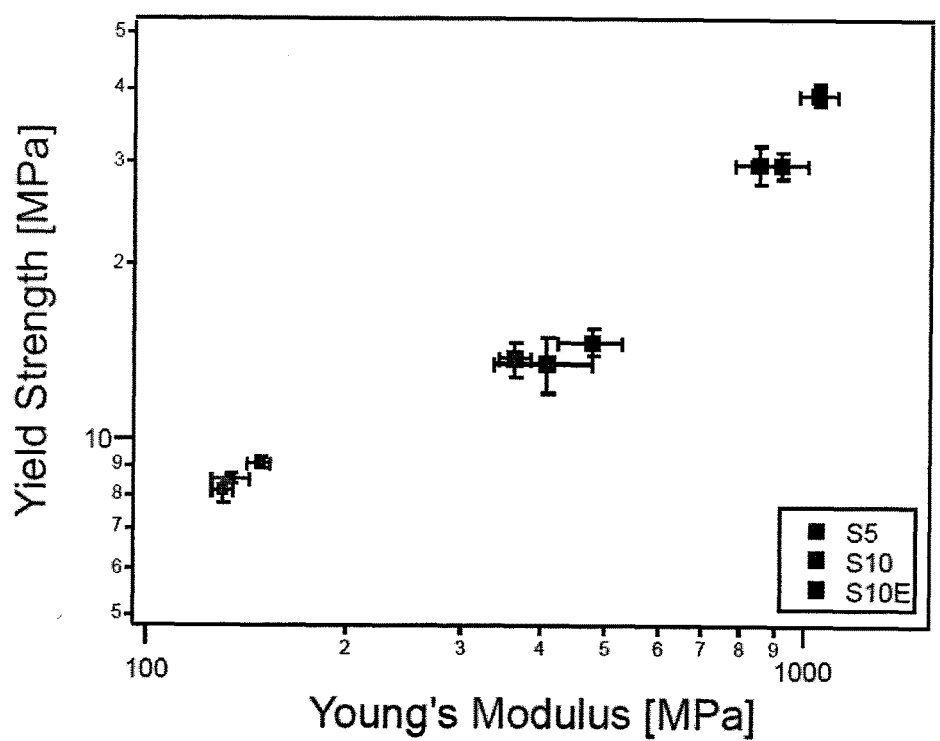
FIG. 17 is a graph showing the yield strength versus Young's modulus of the scaffolds in an embodiment.
Figure 17A:
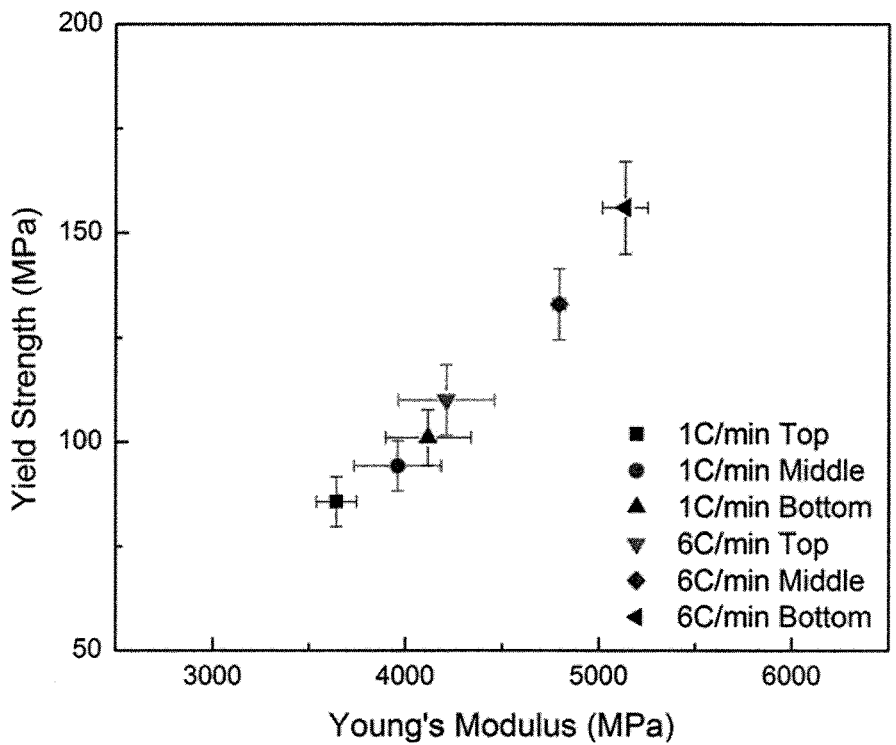
FIG. 17A is an illustration of yield strength and Youngs modulus of scaffolds cast without zirconium acetate.
Figure 17B:
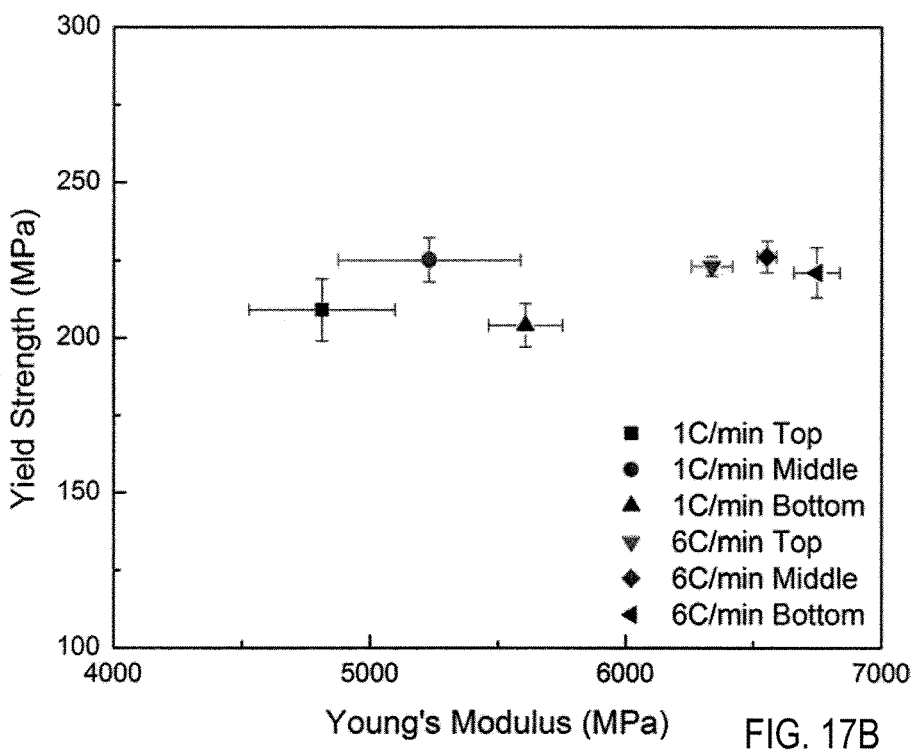
FIG. 17B illustrates yield strength and Youngs modulus of scaffolds freeze-cast with zirconium acetate in the slurry, both FIGS. 17 A and B are under load parallel to freeze direction.
Figure 17C:
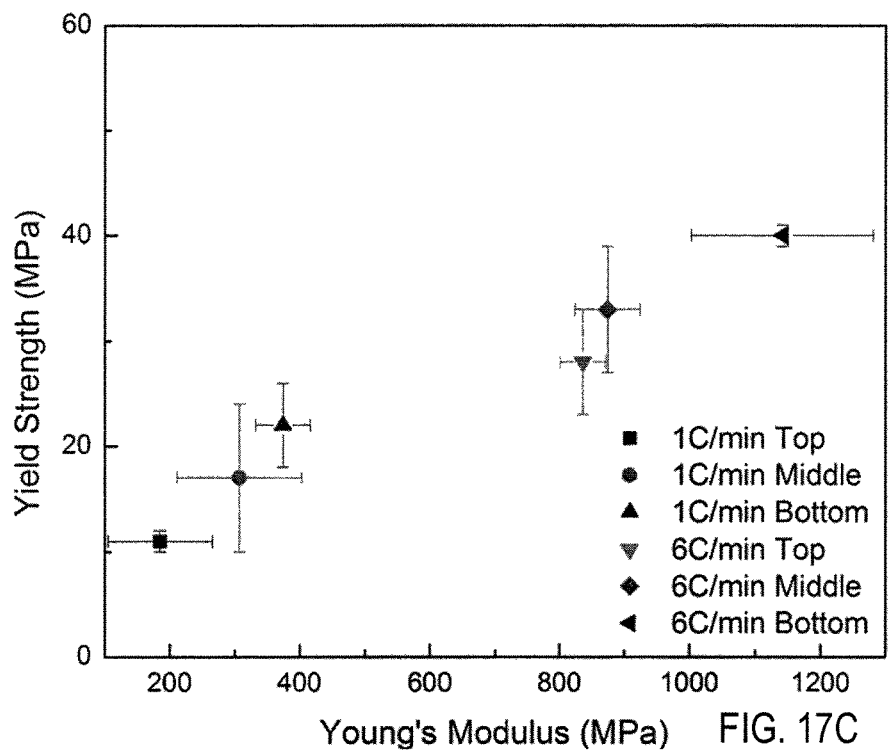
FIG. 17C is an illustration of Young's modulus of scaffolds cast without zirconium acetate.
Figure 17D:
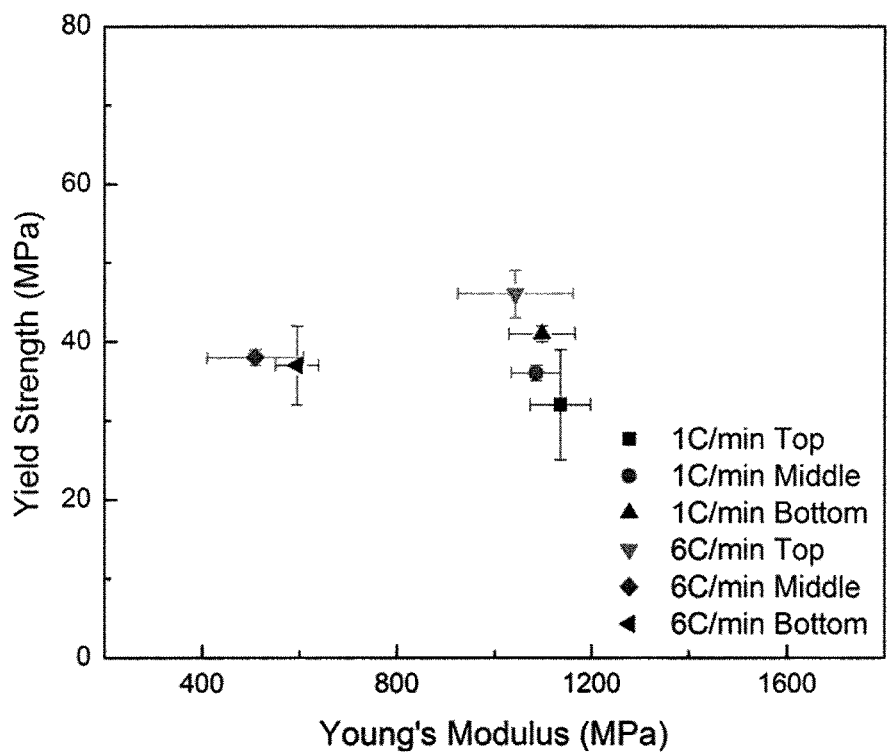
FIG. 17D is an illustration of Young's modulus of scaffolds cast with zirconium acetate, both are graphs illustrating yield strength versus Young's modulus of scaffolds freeze-cast at different rates of cooling both FIGS. 17 A and B are under load perpendicular to freeze direction.

In FIG. 17, yield strength is plotted against Young's modulus. It is shown that by increasing the steel content from 5 vol % (S5) to 10 vol % (S10), higher mechanical properties can be achieved. However, this increase in solid loading was not necessary to achieve higher mechanical properties when analyzing scaffolds S10 and S10E. With an identical amount of stainless steel loading and identical processing conditions, scaffold S10E was almost twice as strong and over twice as stiff as scaffold S10. The reason for this may partially because scaffold S10E had a higher relative density.

Figure 18:
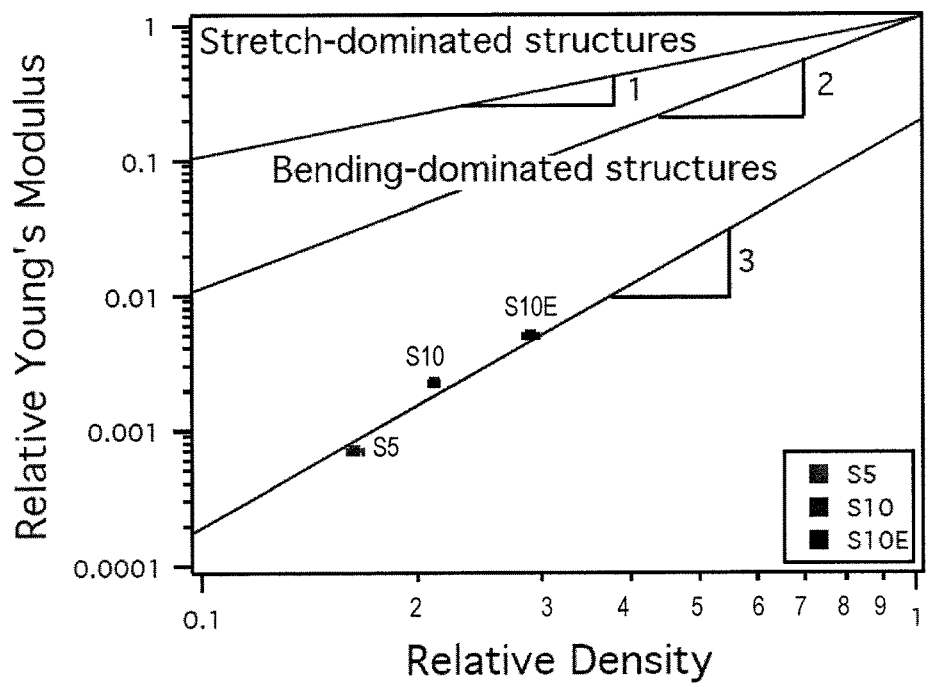
FIG. 18 is a graph showing relative Young's modulus plotted against relative density in an embodiment.

FIG. 18 shows a plot of relative Young's modulus versus relative density. Once more, the different slopes in this graph correspond to the two different deformation behaviors in cellular materials. It can be seen that all of the scaffolds fall significantly below the values predicted by theory.

Figure 19:
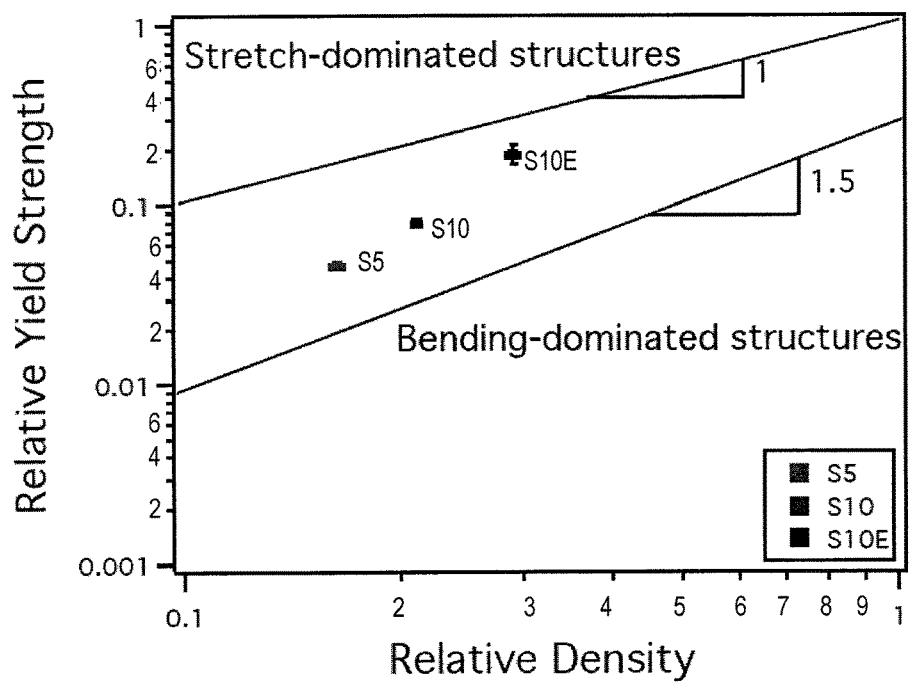
FIG. 19 is a graph showing relative yield strength plotted against relative density in an embodiment.

To further analyze the mechanical behavior of the three scaffolds, graphs of relative yield strength (strength of scaffold/strength of bulk material) and relative Young's modulus (modulus of scaffold/modulus of bulk material) versus relative density (density of scaffold/density of bulk material) were plotted. In FIG. 19, a line of slope 1 indicates honey-comb-like stretch dominated behavior, whereas a line of slope 1.5 indicates foam-like, bending-dominated behavior. All three scaffolds fall well above the line representing bending-dominated structures, meaning that they all perform better in strength than an ideal foam-like material. Scaffold S10E falls closest to the line indicating stretch-dominated structures, showing that it deforms more like an ideal honey-comb-like structure.

To gain a better understanding as to why two scaffolds, which were processed under the same conditions and had equal amounts of steel loading, would have such different properties, their microstructures must be investigated. SEM and x-ray microtomography (μCT) were used to evaluate why scaffold S10E is over twice as stiff and almost twice as strong as scaffold S10.

SEM images of the scaffolds revealed a large difference in pore structure between scaffolds S10 and S10E. Pore sizes and cell wall thickness were measured, from SEM micrographs, as indicated in FIG. 14, revealing that with a thickness of 9±2 μm the cell walls of S10 are about seven times thinner than those of S10E, which are 60±9 μm thick. Furthermore, it was found that S10 had an average lamellar spacing or short pore axis of 34±8 μm, which is almost half of 69±8 μm, the value for S10E.

FIGS. 15A-D show four tomographic reconstructions of scaffolds S10 (FIG. 15A, FIG. 15B) and S10E (FIG. 15C, FIG. 15D). show a full 3-D reconstruction of the scaffolds. The colored planes on the cubes show a cross section perpendicular to the scaffold's freezing direction. Images b and d show these cross sections in 2D. The cubes and cross sections had 1 mm side lengths. FIGS. 15B and 15D show cross sections, perpendicular to the freezing direction, of scaffolds S10 and S10E, respectively. It is shown that the lamellar spacings and wall thicknesses in scaffold S10 are significantly less than those of scaffold S10E.

It was shown that through the process of freeze casting, a highly porous metal scaffold could be produced with tailored features. By modifying the ratio of metal particles to polymer solution in the initial slurry, the overall porosity or relative density could be altered. Scaffold S10 was created using a slurry similar to the one used in scaffold S5. To produce scaffold S10, an increased amount of stainless steel powder was used (10 vol %), double the volume used in scaffold S5 (5 vol %). By increasing the solid loading in the slurry, an increase in relative density, from 0.168 to 0.215, was observed in the sintered scaffolds S5 and S10, respectively. With the freeze casting process, it was shown that greater cell wall thicknesses and pore sizes could be achieved with a slower cooling rate, demonstrating that pore sizes could be controlled by varying the rate at which a scaffold is frozen. When the cooling rate was reduced during the freezing process, additional time was granted for ice crystal growth in the direction perpendicular to the freezing direction, which resulted in an increased pore size, which also corresponded to an increased wall thickness.

Similarly, by introducing different additives, such as ethanol, into the slurry, pore morphology within the final freeze cast scaffold could be altered. Scaffolds S10 and S10E were frozen with identical amounts of stainless steel content (both 10 vol %) and at the same cooling rate (1° C./minute). However, 9 vol % of the polymer solution used to produce scaffold S10E was replaced by ethanol, as opposed to the polymer solution used to make scaffold S10, which consisted only of chitosan and gelatin in 1 vol % acetic acid. A significant increase in pore size and wall thickness was observed in scaffold S10E with the addition of ethanol in its polymer solution. Wall thicknesses in scaffold S10 was measured to be, on average, 9 μm, which is about seven times thinner when compared to the average wall thickness of 60 μm as measured in scaffold S10E. Furthermore, the average lamellae spacing, or short pore axis, in scaffold S10E was observed to be 69 μm, which was about twice the spacing observed in scaffold S10.

It was previously mentioned that a scaffold's relative density could be altered by adjusting the ratio of solid to liquid content in the slurry. Through experimentation, it was found that the relative density could also be altered by adjusting the sintering process. This is illustrated with scaffolds S10 and S10E. Prior to sintering, they had equal relative densities, based on their equal volumes of solid loading. After sintering under identical conditions, scaffold S10 had a relative density of 0.215 and scaffold S10E had an over 30% greater relative density of 0.281. This indicated that scaffold S10E experienced greater densification during sintering. The greater densification in the case of S10E is probably due to the larger amount of porosity in the cell walls prior to sintering, which was observed on SEM micrographs. In scaffold S10, the thickness of the cell walls was limited to only about one to three particles, in contrast the cell walls of scaffold S10E were closer to 20 particles thick and composed of randomly packed particles of varying size resulting in greater porosity within the cell walls. During sintering, scaffold S10E experienced a greater shrinkage in cell wall dimensions, which also leads to a greater reduction in pore size when compared to scaffold S10, resulting in a greater relative density after sintering. It was further shown, during sintering trials conducted in this study, that the relative density of a scaffold could be also be altered by sintering at different temperatures. When the sintering temperature was raised from 1100° C. to 1150° C., scaffolds S10 and S10E both experienced an increase in relative density of 21.5 and 15.2%, respectively. In general, sintering at a higher temperature resulted in greater densification within the cell walls, greater cell wall material shrinkage and thus pore size reduction, thereby increasing the overall relative density of the material.

From optical microscopy images, SEM images, and 3-dimensional tomographic reconstructions, the microstructures within scaffolds S10 and S10E were studied. As previously mentioned, scaffolds S10 and S10E were frozen with the same amount of stainless steel loading and processed under the same parameters. The only alteration was that a 9 vol % of ethanol was incorporated into the polymer solution used to make scaffold S10E. This distinction was responsible for the drastic differences in microstructure between scaffolds S10 and S10E. As discussed in the earlier section, when compared to scaffold S10, scaffold S10E had a greater lamellae spacing and cell wall thickness. It was presumed that this was because the addition of ethanol into the polymer solution effectively lowered the freezing temperature of the slurry, therefore, altering the kinetics of the freezing process, the details of which are, at present, not entirely understood.

During structural analysis, in addition to wall thickness and lamellae spacing, the average aspect ratio of the pores within scaffolds S10 and S10E were measured and found to be 8.8 μm and 5.5 μm, respectively. In FIGS. 14 and 15, it can clearly be seen that scaffold S10 had a much larger aspect ratio than scaffold S10E. This variation in aspect ratios strongly contributed to the differences noted in mechanical properties, as detailed below. Another reason for scaffold S10E achieving higher properties in yield strength and Young's modulus, it thought to be due to its smaller pore aspect ratio, resembling a honey-comb structure, which has higher mechanical properties than an equiaxed, bending-deformation dominated foam because of its stretch-dominated deformation behavior.

Thermal Testing

The thermal diffusivity and specific heat can be measured via using NETZSCH LFA447 (NETZSCH Instruments North America, LLC, Burlington, Mass.). During the thermal testing, the sample is put in a holder between a Xenon Flash Tube/Reflector assembly and an indium antimonide (InSb) IR detector in a furnace. The bottom of a sample was exposed to a high-energy Xenon flash.

Figure 44:
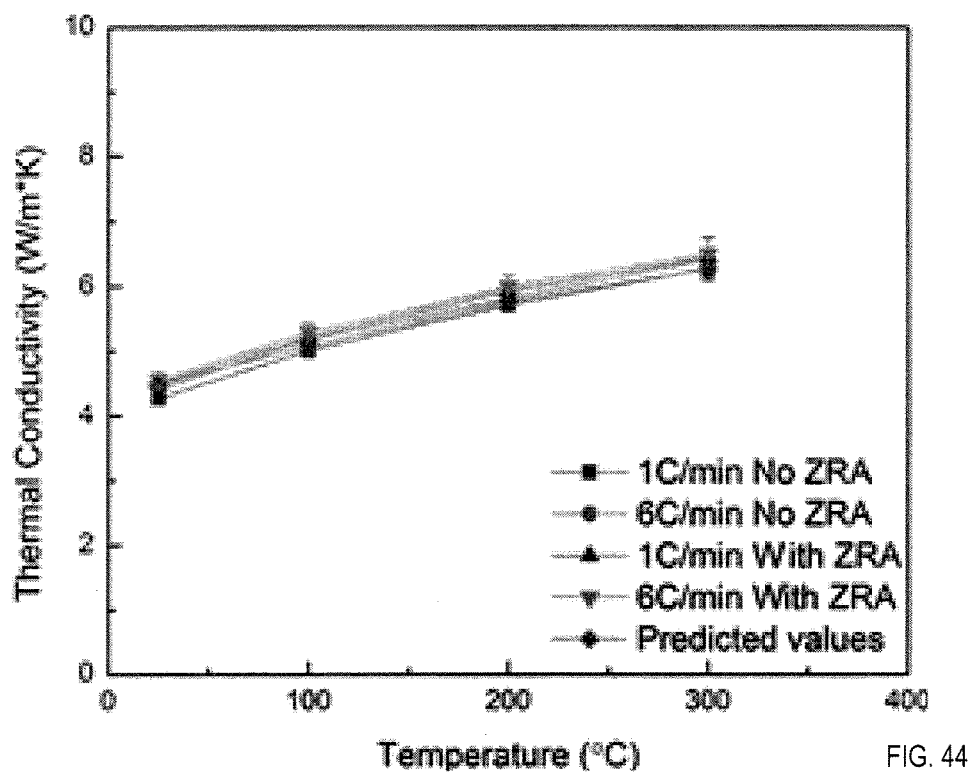
FIG. 44 illustrates thermal conductivity measurements for various scaffolds constructed with and without zirconium acetate and with various freezing rates.
Figure 45:
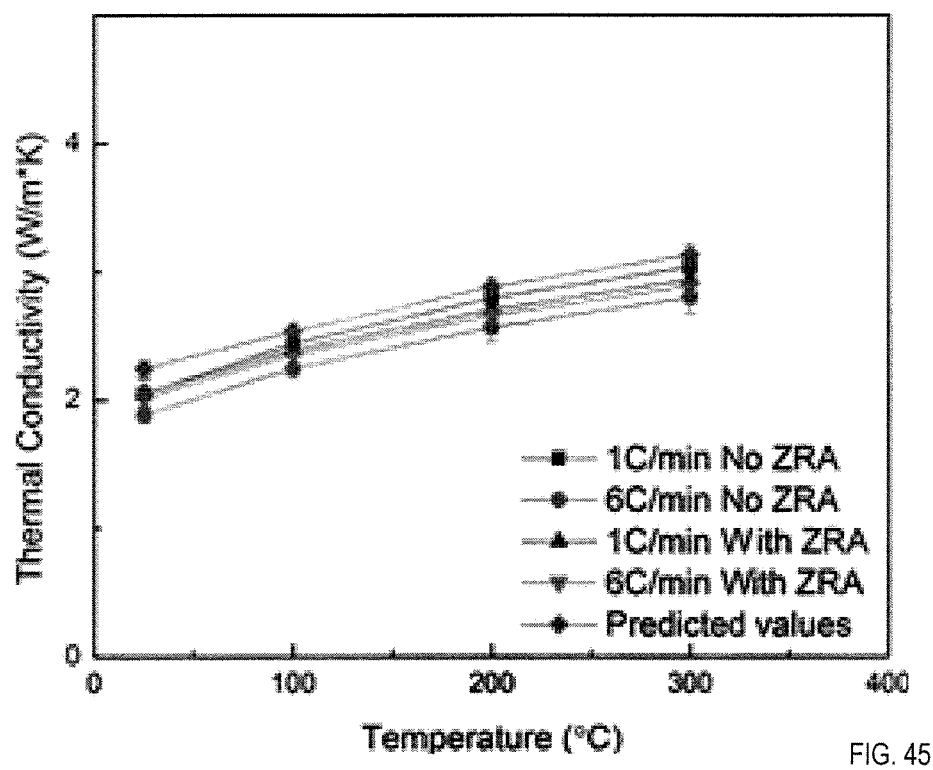
FIG. 45 illustrates thermal conductivity measurements for various scaffolds constructed with and without zirconium acetate and with various freezing rates.

Once the thermal diffusivity and specific heat had been measured, the thermal conductivities both parallel and perpendicular to the freezing direction were obtained through the following equation:

$$D = \frac{\lambda}{C_p \rho}$$

where D is thermal diffusivity, $\lambda$ is thermal conductivity, $C_p$ is specific heat and p is density. See FIGS. 44 and 45 for thermal conductivity measurements for various scaffolds constructed with and without zirconium acetate in the slurry as an ice-crystal modifier and with various freezing rates, differences in thermal conductivity with and without zirconium acetate result from differences in pore structure caused by the zirconium acetate (ZrA).

Structure-Property-Processing Correlations in Freeze-Cast Hybrid Materials

Low molecular weight chitosan (75-85% deacetylated, Sigma Aldrich, St. Louis, Mo.) at a concentration of 2.4% (w/v) was dissolved in 1% (v/v) glacial acetic acid (VWR International, West Chester, Pa.) in doubly distilled water. To achieve thorough mixing, the chitosan solution was rolled on a ball roller at 20 rpm for at least 24 hours before it was used.

Gelatin Solutions were prepared by dissolving 5.5% (w/v) gelatin in 1% (v/v) glacial acetic acid (VWR International, West Chester, Pa.) in doubly distilled water. The gelatin solutions were mixed by magnetic stirring at 60 rpm for 12 hours at a temperature of 35° C. prior to their use. Chitosan and gelatin solutions were mixed in a volume ratio of 4:1 in a high shear mixer (SpeedMixer, DAC 150 FVZ-K, FlackTek, Landrum, S.C.) at a speed of 1600 rpm for 60 s to blend a 3% (w/v) polymer solution consisting of 63 wt % chitosan and 37 wt % gelatin.

Slurry preparation was done after the chitosan and gelatin solution was prepared. To obtain ceramic-biopolymer composite solutions, 2.7 g of $Al_2O_3$ particles were added to 10 mL of polymer solution. In the case of chitosan-gelatin solutions this yielded a solid weight ratio of 9:1 (alumina:biopolymer) and a volume ratio of the dry solid in the lyophilized scaffolds of 75% alumina and 25% biopolymer (16% chitosan, 9% gelatin). Chitosan-gelatin solutions were used for most of the experiments in this study, including the correlation between cooling rate and structural features and the investigation of different particle sizes and shapes.

For the systematic ethanol study, the investigation of different porosities within the scaffolds as well as for the biocompatible hydroxyapatite/chitosan scaffolds, pure chitosan solutions were used. In the final scaffolds, this resulted in a solid weight ratio of 11.25 (alumina to chitosan) which corresponds to a dry solid volume fraction of 77% alumina and 23% chitosan. As alumina fillers, three different types of particles were used: platelets (Alusion™, Antaria Limited, Bentley, Western Australia) thickness: 300-500 nm, diameter: 5-10 µm small spherical particles (Sasol North America-Ceralox Division, Tucson, Ariz.) average diameter: 400 nm large spherical particles (Sigma Aldrich, St. Louis, Mo.) diameter: 5-10 µm The particle sizes of the spherical alumina particles were chosen to represent the smaller (thickness) and larger dimensions (diameter) of the alumina platelets used in this study. For the biocompatible hydroxyapatite/chitosan scaffolds, hydroxyapatite powder of spherical particles with an average particle diameter of 2.3 µm was used (Trans-Tech, Inc., Adamstown, Md.). Directly before freeze casting, the suspensions were mixed and degassed in a shear mixer (SpeedMixer, DAC 150 FVZ-K, FlackTek, Landrum, S.C.) at a speed of 1600 rpm for 60 s.

Freeze casting ceramic-polymer slurries (12 mL) were pipetted into freezing molds directly before freeze casting. The molds were placed on the cold finger of the freeze casting apparatus and allowed to adjust their temperature to 5° C., which was the starting temperature of the cold finger. With the PID controller, the thermocouple and the band heater, the temperature of the upper cold finger surface was decreased according to predefined cooling programs. Two different cooling rates were applied: 1° C./min and 10° C./min. As the temperature of the cold finger was lowered below 0° C., ice nucleation started at the bottom plate of the mold and the slurries were directionally solidified from bottom to top. For both cooling rates, the temperature was decreased until a final freezing temperature of −80° C. was reached. The molds were held at this temperature until the complete scaffold was solidified.

Freeze drying was performed after freeze casting. The frozen scaffolds were unmolded with a modified arbor press and transferred to a benchtop lyophilizer (FreeZone 4.5, Labconco, Kansas City, Mo.) where they were freeze-dried (lyophilized) for at least 48 hours. The pressure within the system was 0.02 mBar and the cold trap was set to a temperature of −52° C. The obtained scaffolds had a cylindrical shape with a diameter of 18 mm and a height of 35 mm. After lyophilization, the scaffolds had an average porosity of 91%.

Figure 37:
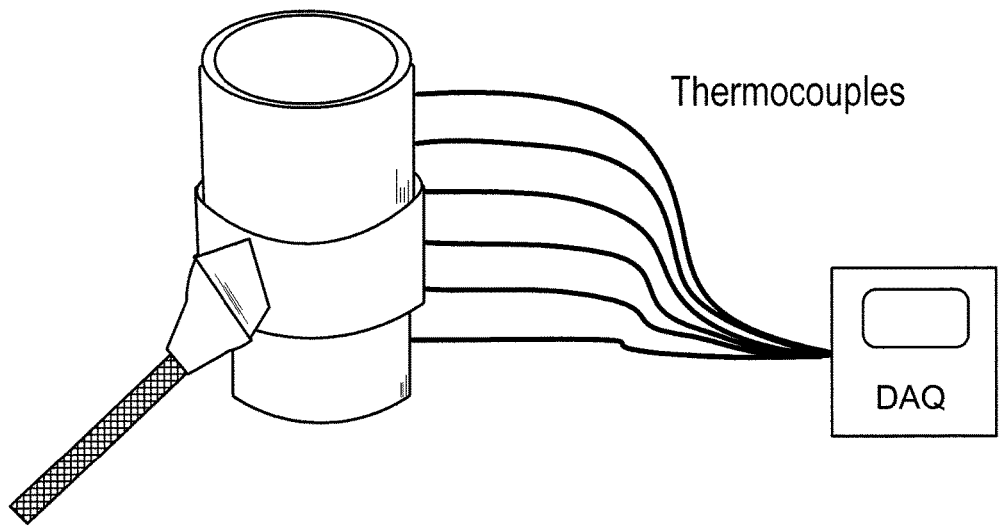
FIG. 37 illustrates six thermal couples for measuring temperatures during freeze casting in an embodiment.

Custom-made thermocouple mold equipped with 6 thermocouples along its height. The thermocouples were connected to a data acquisition unit where the temperatures measured at each thermocouple were recorded over time. Six thermocouples were mounted along the height of a PTFE mold to monitor the temperature profile during freezing (see FIG. 37). For three different alumina powders, the particle self-assembly in the honey-comb walls was determined and the pore structure and mechanical properties measured after processing with cooling rates of 1° C./min and 10° C./min which correspond to freezing front velocities of 7.4 µm/s and 27.7 µm/s, respectively.

Scaffold preparation for characterization and tests is described as follows. To test the effect of different ethanol concentrations on structure and properties, slurries of alumina platelets in chitosan solutions were prepared. All scaffolds included the same amount of ceramic filler but different amounts of ethanol. In addition to a control with 0% ethanol, the four ethanol concentrations 5, 10, 15 and 20% (v/v) were studied. All slurries were freeze-cast at a cooling rate of 10°/min. After lyophilization, the scaffolds possessed an overall porosity of 91.3±0.6%.

For X-ray microtomography, rectangular scaffolds of 5 mm×5 mm and a thickness of 2 mm were cut with a diamond wire saw so that the 2 mm dimension was oriented parallel to the freezing direction. For tomography, the scaffold was mounted upright on a cylindrical metal holder and placed in a SkyScan 1172 high-resolution desktop micro-computed tomography system (SkyScan, Kontich, Belgium). Radiographs were taken at a voltage of 59 kV, a current of 167 µA and a pixel size of 1.47 µm. An exposure time of 2356 ms and a frame averaging of 5 was used. The rotational step size was 0.15°, thus 1200 angles were used for reconstruction. This tomographic reconstruction was performed with the SkyScan software NRecon.

FIGS. 9A-C are SEM micrographs of composite cell walls of hybrid scaffolds made from a) small particles b) bimodal particles c) large particles. Scale bar is 5 µm. The SEM micrographs of the three different scaffold types reveal significant differences in the wall architecture.

The size of the small particles is much smaller than the wall thickness and the particles are thus incorporated into the wall structure, glued together by the polymeric matrix (see Table 2). Between 5 and 15 layers of particles make up the walls with a thickness of 2 to 7 micrometers. In the case of the large particles, the cell walls consist only one layer of particles. They are incased and interconnected by a polymer membrane. The walls made from the bimodal composition are a combination of the two. The polymer membrane between the large particles includes several layers of small particles and the wall thickness is smaller in comparison to the small particle scaffolds because of the smaller amount of small particles that have to be accommodated within the walls.

TABLE 2

WALL THICKNESS IN DEPENDENCE OF THE PARTICLE SIZE AND FREEZING RATE AS DETERMINED WITH SCANNING ELECTRON MICROSCOPY.

| Freezing rate | Alumina particle size | Overall porosity [%] | Wall thickness [µm] |
|---|---|---|---|
| 1° C./min | 400 nm | 91.4 ± 0.1 | 5.79 ± 1.06 |
| 1° C./min | 30:70 400 nm:10 µm | 90.8 ± 0.1 | 3.12 ± 0.67 |
| 1° C./min | 10 µm | 90.5 ± 0.2 | 0.55 ± 0.38 |
| 10° C./min | 400 nm | 91.8 ± 0.1 | 2.79 ± 1.00 |
| 10° C./min | 30:70 400 nm:10 µm | 90.9 ± 0.1 | 2.09 ± 0.20 |
| 10° C./min | 10 µm | 90.2 ± 0.1 | 0.32 ± 0.06 |

Young's modulus for scaffolds including different particles sizes and size distributions, frozen at two different freezing rates of 1° C./min and 10° C./min.

The representative compression curves and the SEM images are shown for scaffolds made from a) small particles (FIG. 9a) and b) large particles (FIG. 9c) respectively. As the microstructure indicates, the small particles and the obtained brick-and-mortar structure result in brittle failure while the large particles and the beads-on-a-string architecture lead to elastic-plastic failure. Scale bar is 5 µm.

Not only the absolute mechanical properties were increased for the larger average particles size, but also the shape of the compression curves was different from those of the other compositions. Scaffolds made from small particles, have a saw-tooth patterned stress-strain curve, typical for brittle cellular solids, while those made from large particles have a smooth plateau region, which is typical for porous scaffolds with an elastic-plastic failure. The scaffolds including the bimodal particles size distribution show a mixed behavior and, depending on the height in the scaffold and the freezing rate, either have a saw-tooth stress-strain curve or a smooth plateau. Thus, through the variation of the particle size, not only the mechanical properties, but also the failure modes can be controlled. Scaffolds made from small particles fail in a brittle manner, scaffolds made from large particles show elastic-plastic failure.

Figure 22:
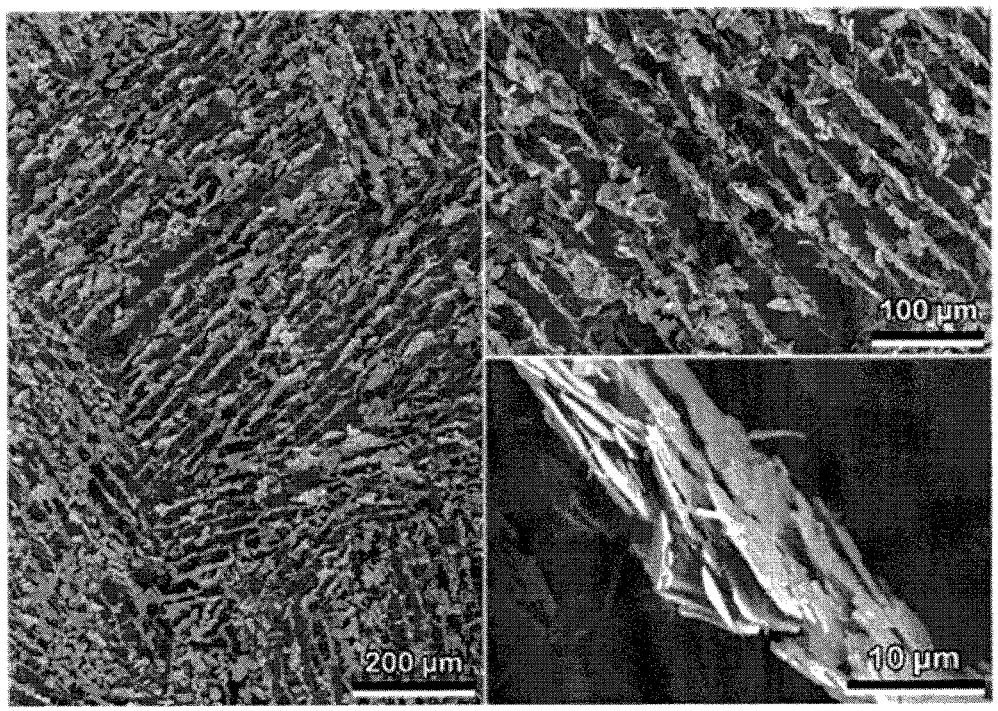
FIG. 22 are cross-section of freeze-cast scaffolds perpendicular to the freezing direction showing the high degree of alignment of the platelets in the composite walls in an embodiment.

Scaffold structure is shown in FIG. 22: The created freeze-cast scaffolds indeed possessed a lamellar structure with composite walls of highly aligned alumina platelets glued together by the polymeric phase. The lamellar spacing was the same as previously determined for the scaffolds including spherical particles with 28 µm for a freezing rate of 10° C./min and 34 µm for a freezing rate of 1° C./min. In all SEM images, the nacre-like arrangement of the platelets in the walls is evident, however, due to cutting damage, several lamella show rugged edges with platelets or small pieces of the lamellae that were pushed over the interlamellar spaces.

Focused ion beam was used to cut a cross-section for SEM images. While the SEM images of the wire-cut cross-sections showed the general alignment of platelets, the damage of the cut partly obscured the real microstructure of the lamellae. Especially for the lateral dimension of the lamellae and the degree of platelet-alignment within the cell walls, no reliable statements could be made. A non-destructive method like X-ray microtomography would have been desirable at this point but unfortunately does not provide enough resolution to resolve individual platelets. To still be able to investigate the micro-architecture of the lamellae and the arrangement of platelets within the pore walls, a focused ion beam (FIB) system was used to cut a window into a single lamella. The beam current of the FIB (Strata DB235, FEI Company, Hillsboro, Oreg., USA) was set to 50 pA and an accelerating voltage of 30 kV was used.

FIG. 23C shows a close-up of the cross-section, revealing the arrangement of platelets and the thickness of the lamella. The platelet-composite walls indeed possess the desired nacre-like arrangement of highly aligned platelets glued together by the polymeric phase. As estimated from the SEM images the wall has a thickness of approximately ten platelets.

FIG. 16 shows typical stress/strain curve of the investigated hybrid scaffolds. Young's modulus was determined from the initial linear region of the curve while the yield strength was taken as the stress at which the material left the linear region and the slope of the curve changed significantly. Toughness was determined as the area under the stress-strain curve up to a strain of 60%.

Figure 20:
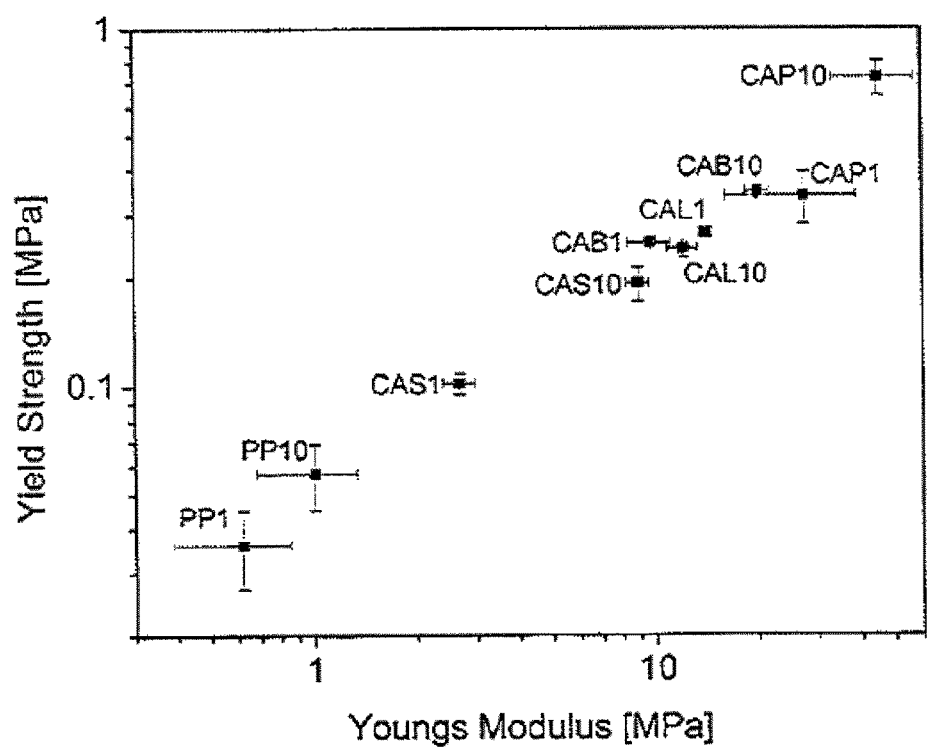
FIG. 20 is a plot of yield strength against Young's modulus for scaffolds including different particles sizes and size distributions, frozen at two different freezing rates of 1° C./min and 10° C./min in an embodiment.
Figure 21:
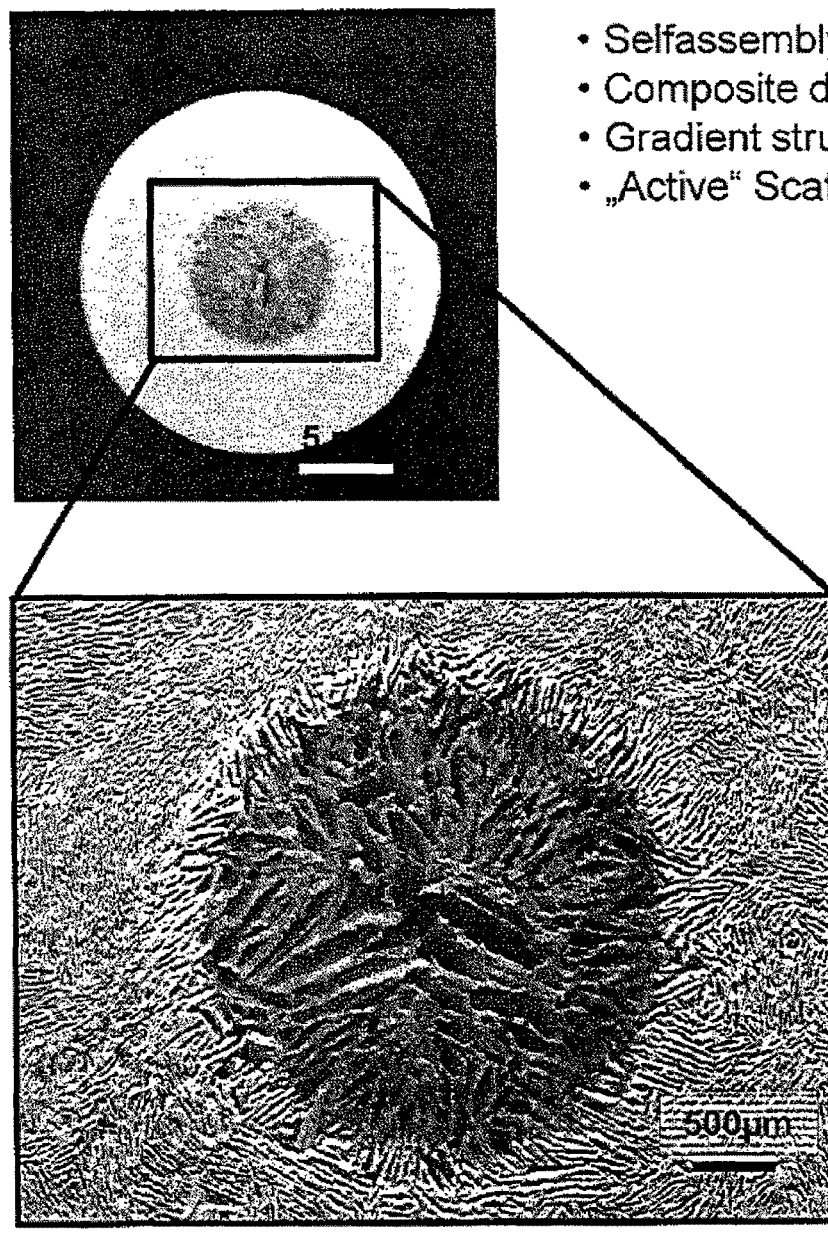
FIG. 21 are optical images showing the overall core-shell assembly in an embodiment.

FIG. 20 shows Young's modulus and yield strength for the porous hybrid materials including small, bimodal and large particles as well as platelets. The platelets achieve the highest stiffness and strength while the small particles possess the lowest values.

Films made by drying of slurries with identical composition as those used for freeze casting showed strong particle adhesion and dense particle packing. However, due to the limited availability of polymeric glue, the different slurry recipes yielded significantly changing particle arrangement both in the 2D films and in the freeze-cast cell walls. Small particles with a diameter below the wall thickness were incorporated into the walls and densely packed in multilayers, resulting in a brick-and-mortar structure. Large particles with a diameter above the wall thickness resulted in pearl-on-a-string arrangement with a single layer of particles within each lamella.

Sedimentation Stoke's Law:

$$v_S = \frac{2}{9}\frac{(\rho_P - \rho_L)}{\mu}gr^2$$

$\rho_R$: density of particle
$\rho_L$: density of liquid
$\mu$: viscosity of fluid
r: particle radius
g: gravitational acceleration Effect of Particle Sizes and Cooling Rates on Mechanical Properties FIG. 20 illustrates results from compression tests on porous composites. The mechanical properties can be significantly varied through different particle size distributions and freezing rates. Both modulus and strength increase with an increase in the freezing rate for the composites with small (CAS) and bimodal (CAB) particle sizes, but stay constant for large particles (CAL). For both freezing rates, the small powders or particles resulted in the material with the lowest mechanical properties (CAS). At 1° C./min, the composite with the large particles (CAL) achieved both the highest modulus and the highest strength with 14 MPa and 0.23 MPa, respectively. At 10° C./min, the scaffolds with the bimodal particle distribution (CAB) had with 20 MPa and 0.27 MPa the highest respective values. These property differences are due to differences in particle sedimentation speed, freezing front velocity, and, very importantly, the arrangement of particles in the lamellae.

Figure 8:
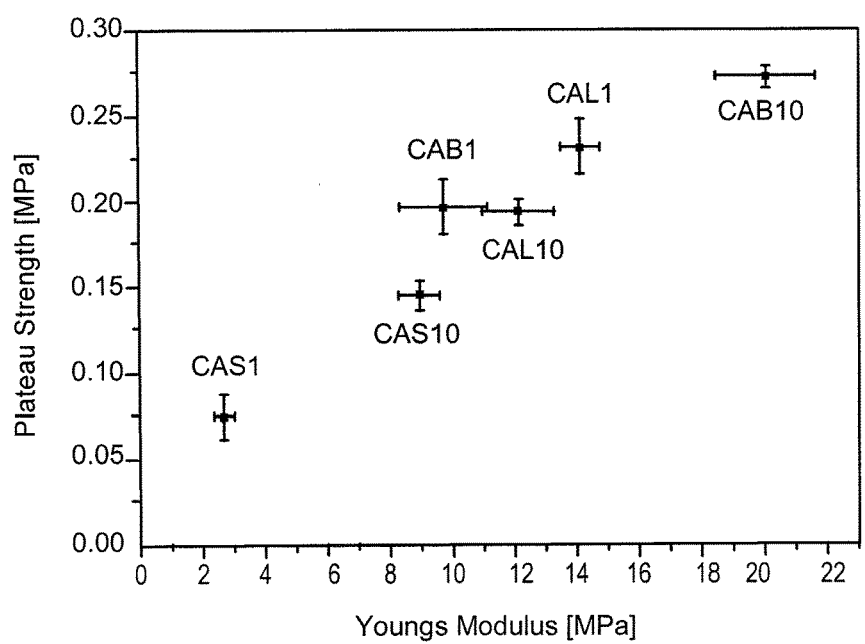
FIG. 8 is a plot of plateau strength against Young's modulus for scaffolds including different particles sizes of particles and size distributions, frozen at two different freezing rates of 1° C./min and 10° C./min in an embodiment.
Figure 11:
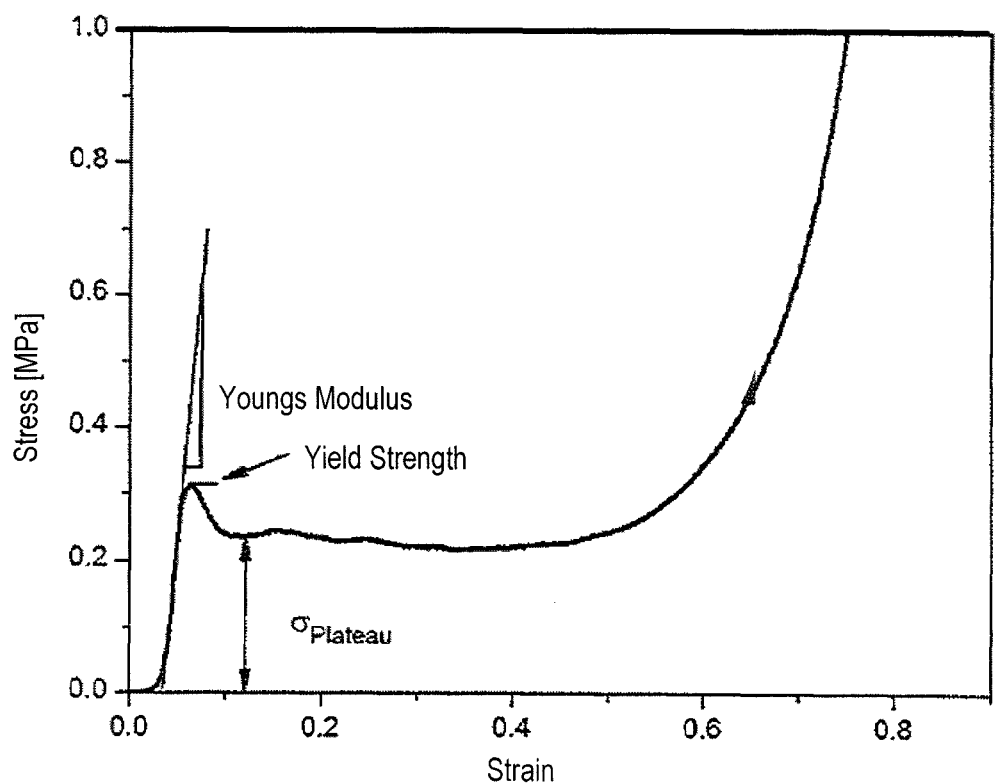
FIG. 11 is a representative compression curve for scaffolds made from large particles in an embodiment.

FIG. 8 is a plot of plateau strength against Young's modulus for scaffolds including different particles sizes of particles and size distributions, frozen at two different freezing rates of 1° C./min and 10° C./min in an embodiment.

The experimental results reveal strong structure-property-processing correlations and illustrate that the mechanical properties as well as the structure of freeze-cast hybrid scaffolds can be controlled independently on at least three hierarchical levels. First, the overall porosity and the range of mechanical properties are determined by a slurry composition and thus the amount and choice of polymer and ceramic filler (macro scale). Second, processing parameters like the freezing rate control both the lamellar spacing and the pore shape (microscale). Third, a particle size distribution and a polymer-to-ceramic ratio result in significantly different wall architectures.

A comparison to literature values obtained for similar but isotropic composite scaffold shows the tremendous potential of the freeze casting processing technique. The produced hybrid scaffolds cover the whole range of reported mechanical properties for one given porosity which proves the independence of mechanical properties from overall porosity can be achieved.

Freeze Casting of Platelet-Based Slurries

Freeze casting, whether of metals or ceramics, or composites capitalizes on directional solidification. When a solution or slurry is frozen, pure ice crystals form, rejecting dissolved or dispersed matter into intercrystalline spaces. Subsequent freeze-drying removes the ice but preserves the lamellar or tubular porosity that it templated. Directional solidification of the ice results in a honey-comblike structure with anisotropic mechanical properties. Material composition, additives and freezing rate allow to tune overall porosity, pore size and pore geometry. Water-based biopolymer solutions of chitosan and gelatin where used as both binders and polymer matrix. Ceramic particles of three different particle size distributions were added: small (Ø 400 nm), large (Ø 10 µm) and bimodal (70 vol % large, 30 vol % small). Hybrid scaffolds were prepared using two different cooling rates: 1° C./min and 10° C./min.

Freeze casting of platelet-based slurries creates highly porous scaffolds with a nacre-like cell wall structure due to self-assembly during processing. The "cellular nacre" possesses properties considerably higher than those of composite scaffolds of the same composition made with spherical particles. They offer tremendous potential for use in applications, which require a combination of high porosity, stiffness, strength and toughness, such as filters, catalyst carriers and tissue scaffolds. Like its natural counterpart, the freeze-cast material benefits from a complex, hierarchical architecture that, up to now, has been difficult to emulate in bulk materials.

The freeze casting of platelet slurries produces highly porous cellular materials with self-assembled nacre-like cell walls and property profiles. The self-assembly happens during the ice-templating of the platelets that are of the same dimensions as the mineral building blocks in natural nacre (FIG. 23B). The directional solidification during freeze casting causes a phase separation to occur in the platelet-slurry. Lamellae of pure water-ice grow, alternating with lamellae of a ceramic-polymer composite, causing the platelets to self-assemble into a nacre-like structure. Once fully frozen, the ice phase is removed through sublimation with a freeze dryer, leaving behind a porous ceramic-polymer composite scaffold.

Two types of polymer solutions were prepared: 2.4% (w/v) low molecular chitosan (75-85% deacetylated, Sigma Aldrich, St. Louis, Mo., USA) and 5.5% (w/v) gelatin (type B, from bovine skin, Sigma Aldrich, St. Louis, Mo., USA) dissolved in 1% (v/v) acetic acid in distilled water. The chitosan solution was prepared on a bottle roller for 24 hrs at room temperature (25° C.); the gelatin solution was stirred on a hot plate at 40° C. for at least two hours. To obtain the final biopolymer solution, the two solutions were mixed at an 8:2 chitosan:gelatin solution volume ratio. This resulted in a solid weight ratio of 7:4 (chitosan:gelatin).

Ceramic Slurry

To prepare the ceramic slurry, 27% (w/v) of alumina powder consisting of either spherical particles or platelets were added to the chitosan-gelatin solution to achieve a dry weight ratio of 9:0.64:0.36 (alumina:chitosan:gelatin), or 9:1 (alumina:biopolymer). The alumina platelets had a diameter and a thickness of 5-10 µm and 300-500 nm respectively (Alusion™, Antaria Limited, Bentley, Western Australia). The spherical particle scaffolds were made either from small particles with a diameter of 400 nm (Ceralox SPA-RTP SB, Sasol North America Inc., Tucson, Ariz., USA), large particles with a diameter of 10 µm (Sigma Aldrich, St. Louis, Mo., USA), or a bimodal distribution with a 7:3 large:small particle volume ratio. The two particle sizes were chosen to match the thickness and the diameter of the platelets used in our study, which have dimensions that closely resemble those of the aragonite platelets in Abalone nacre.

Figure 25:
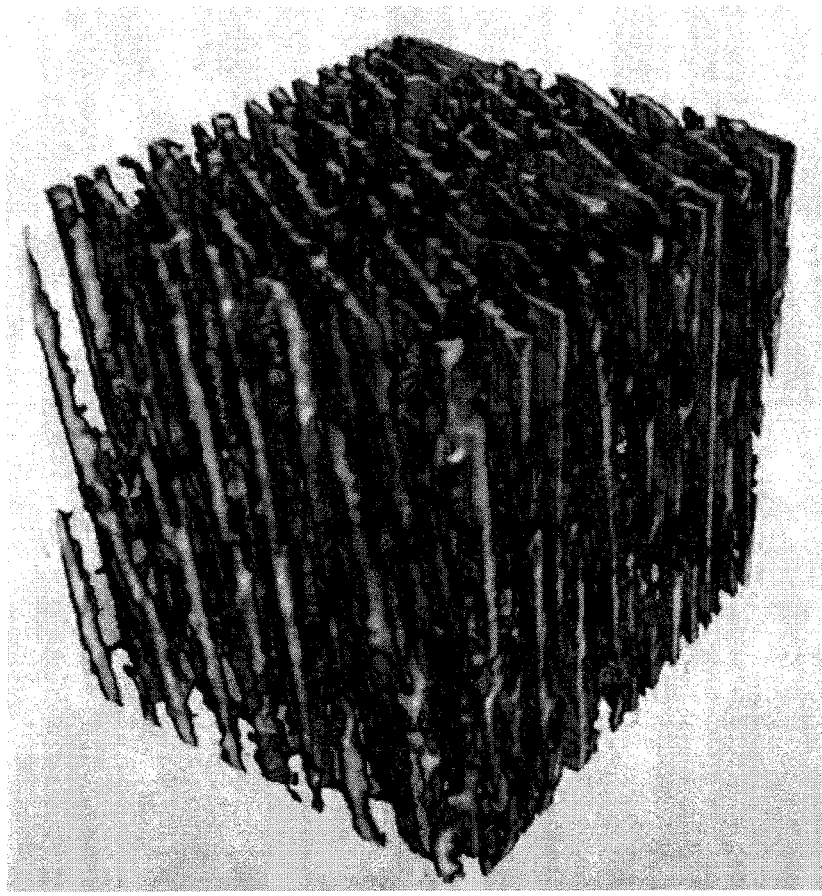
FIG. 25 is an X-ray microtomography data visualized with the Avizo Standard software package. Edge length of the cube is 500 μm in an embodiment.
Figure 26:
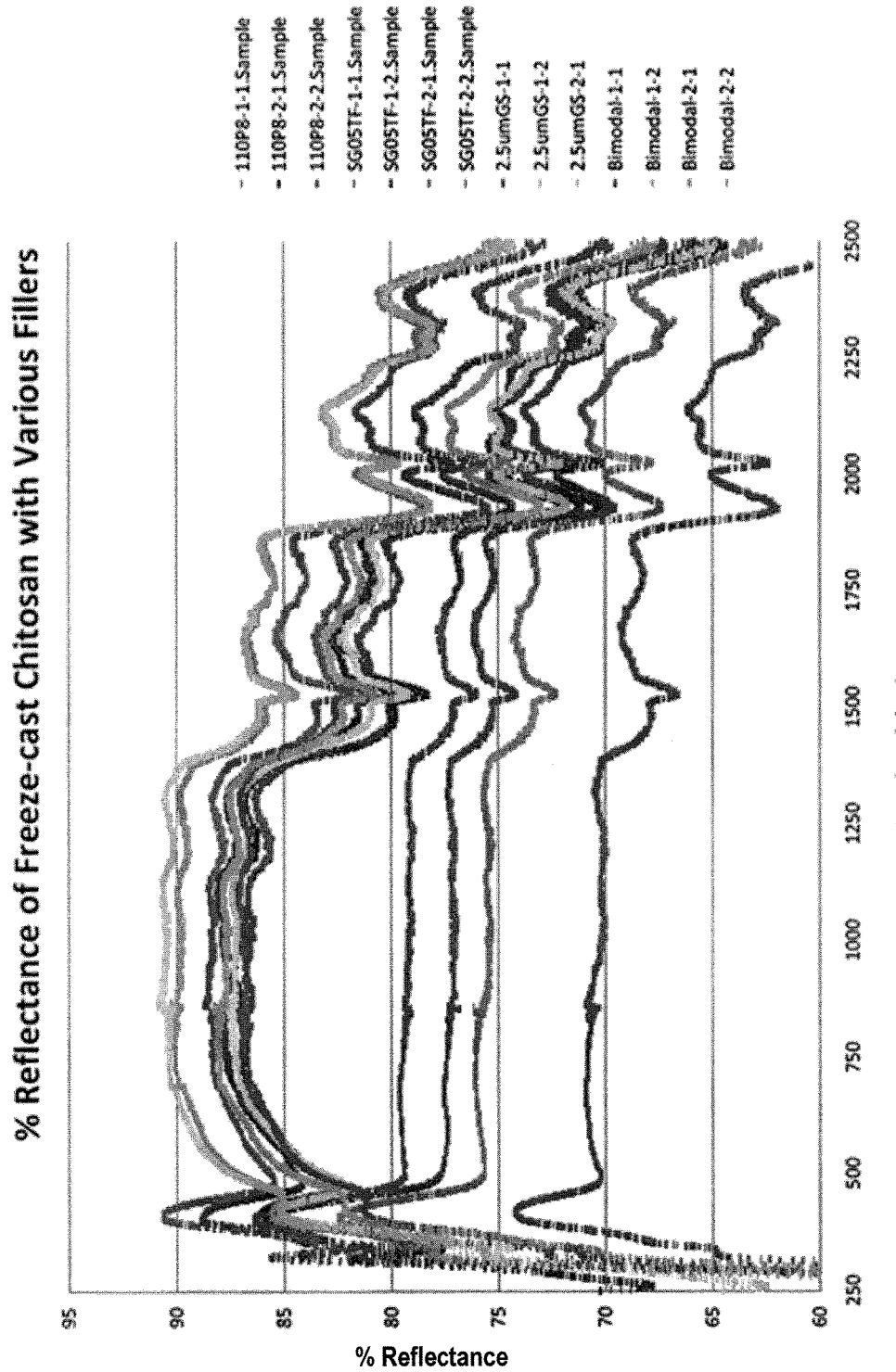
FIG. 26 are UV-Vis-NIR reflectance spectra with various fillers from 250 nm to 2500 nm in an embodiment.
Figure 27A:
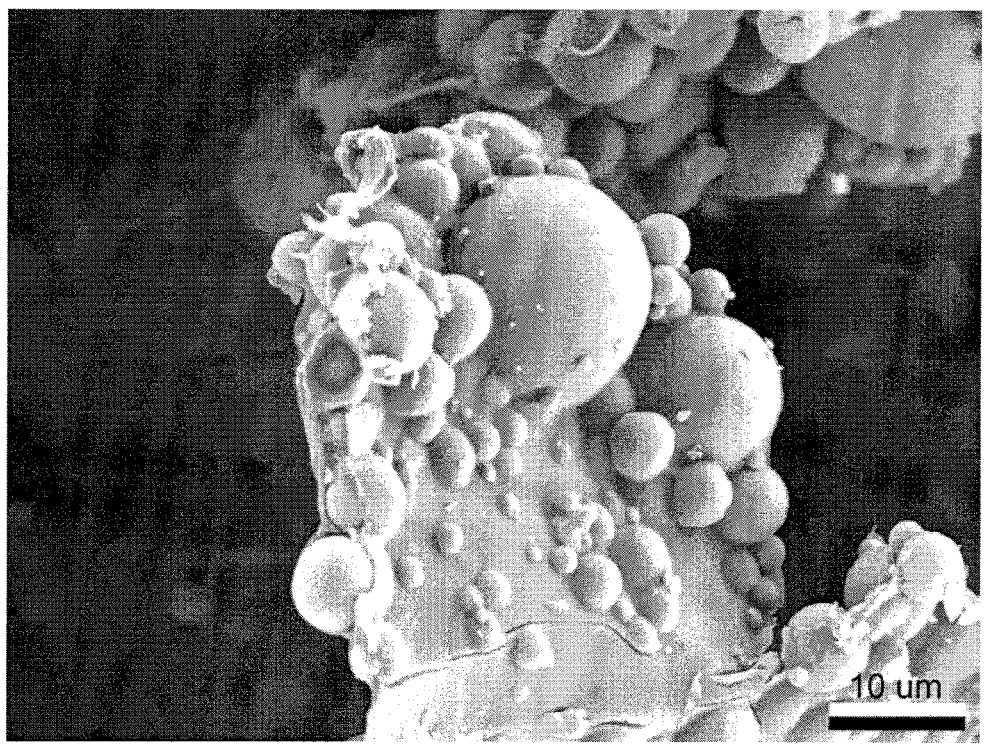
FIG. 27A is a SEM image of a broken strut showing encapsulated hollow glass microspheres at 1600× magnification in an embodiment.
Figure 27B:
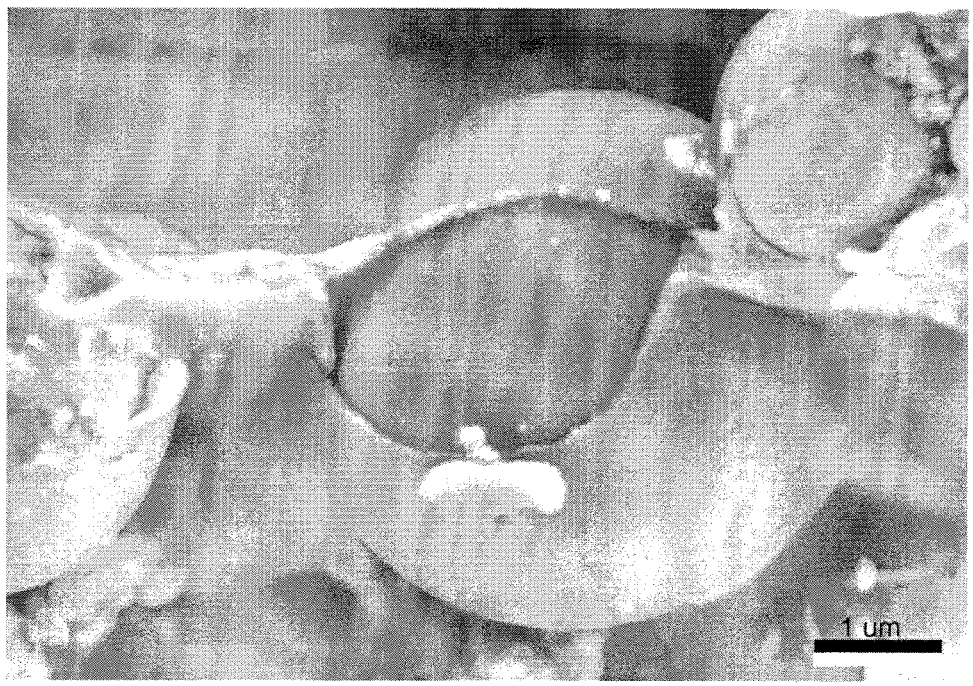
FIG. 27B is a SEM image of a glass sphere encapsulated in chitosan polymer, image is shown at 15170× magnification in an embodiment.
Figure 28:
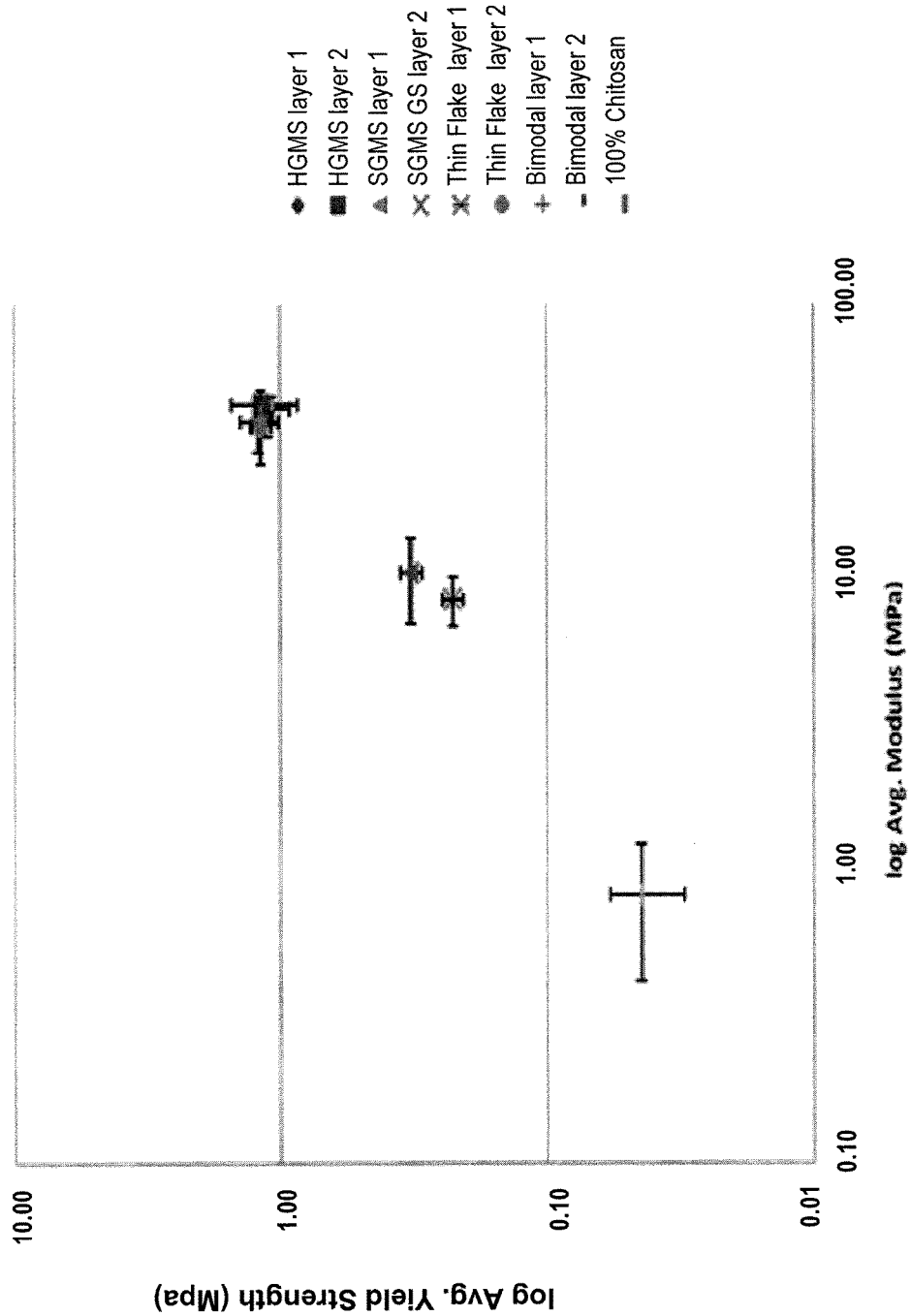
FIG. 28 is a plot of Log Avg. Yield Strength vs. Log Avg. Modulus in an embodiment.
Figure 29:
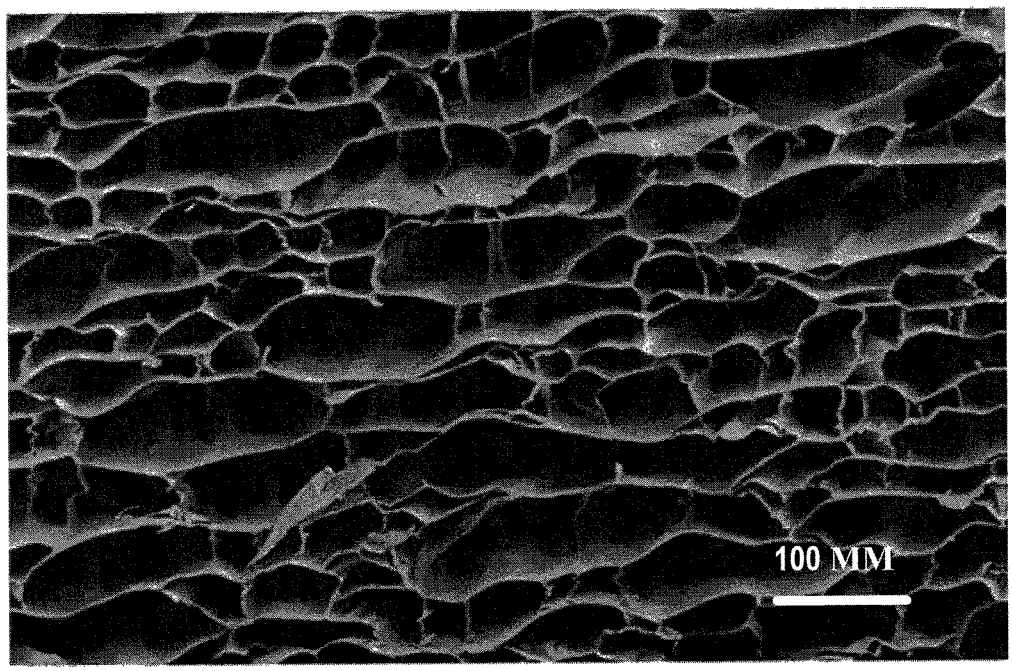
FIG. 29 is a SEM image of a polymer scaffold in an embodiment.
Figure 30:
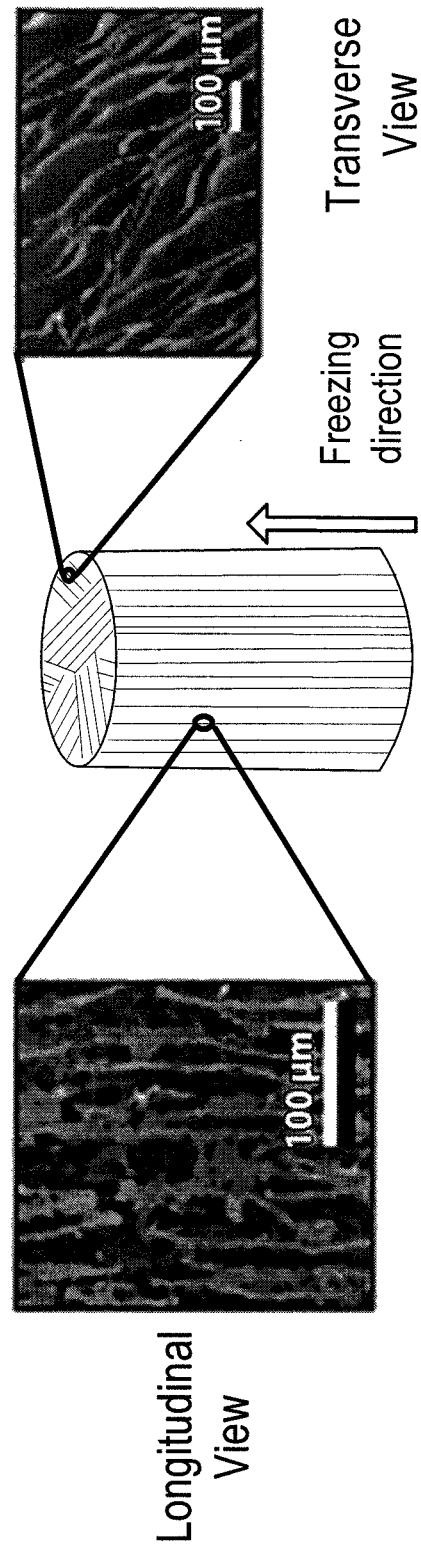
FIG. 30 illustrates longitudinal view and traverse view of a scaffold in an embodiment.
Figure 31:
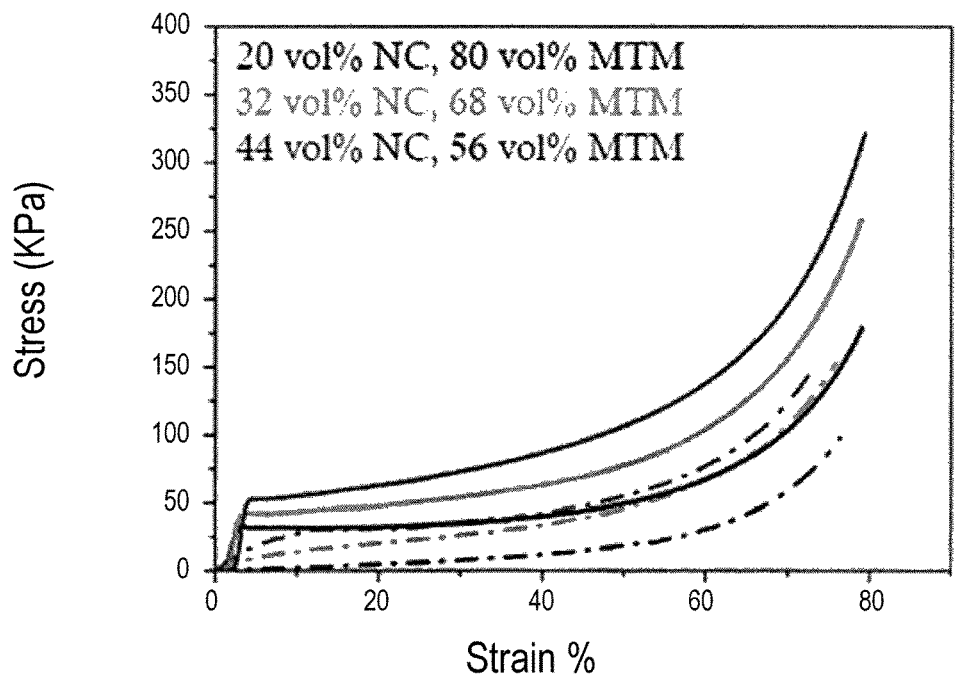
FIG. 31 illustrates stress vs. strain curves for nanocellulose-reinforced composites in an embodiment.
Figure 32:
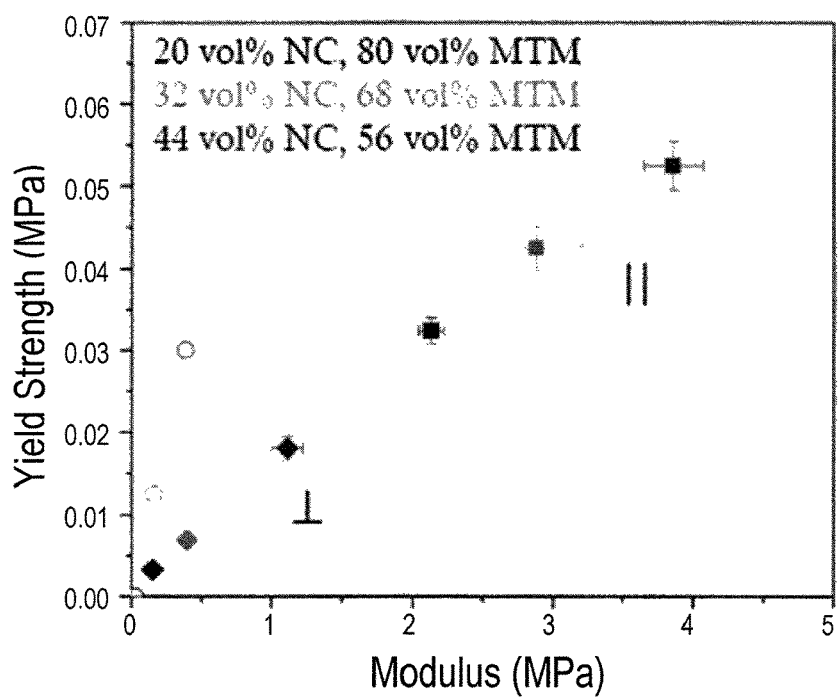
FIG. 32 illustrates yield strength vs modulus curves for nanocellulose-reinforced composites in an embodiment.
Figure 33:
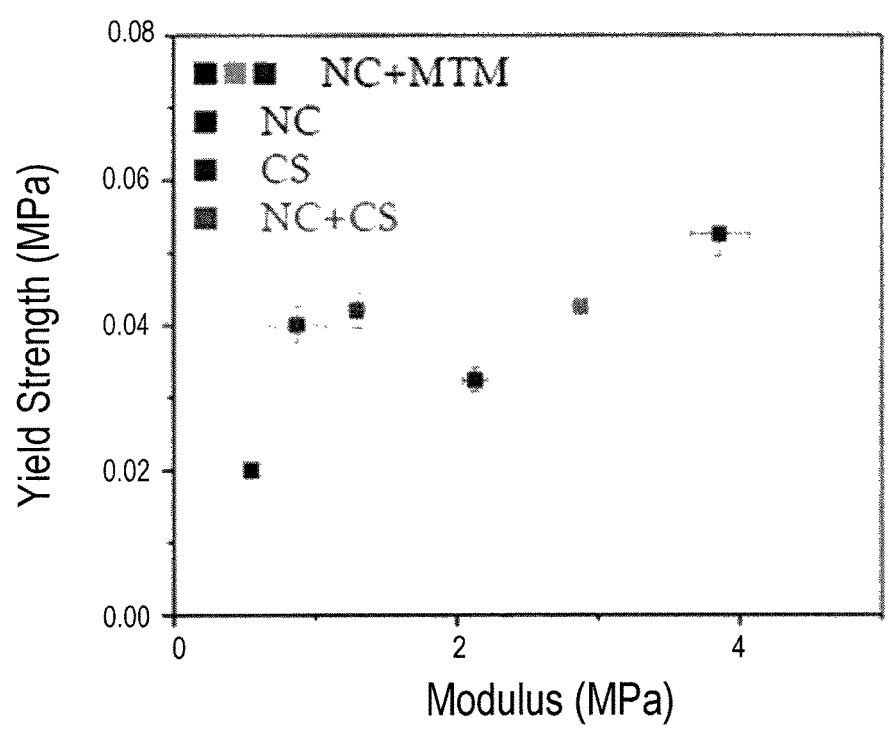
FIG. 33 illustrates yield strength vs modulus curves for nanocellulose-reinforced composites in an embodiment.
Figure 34:
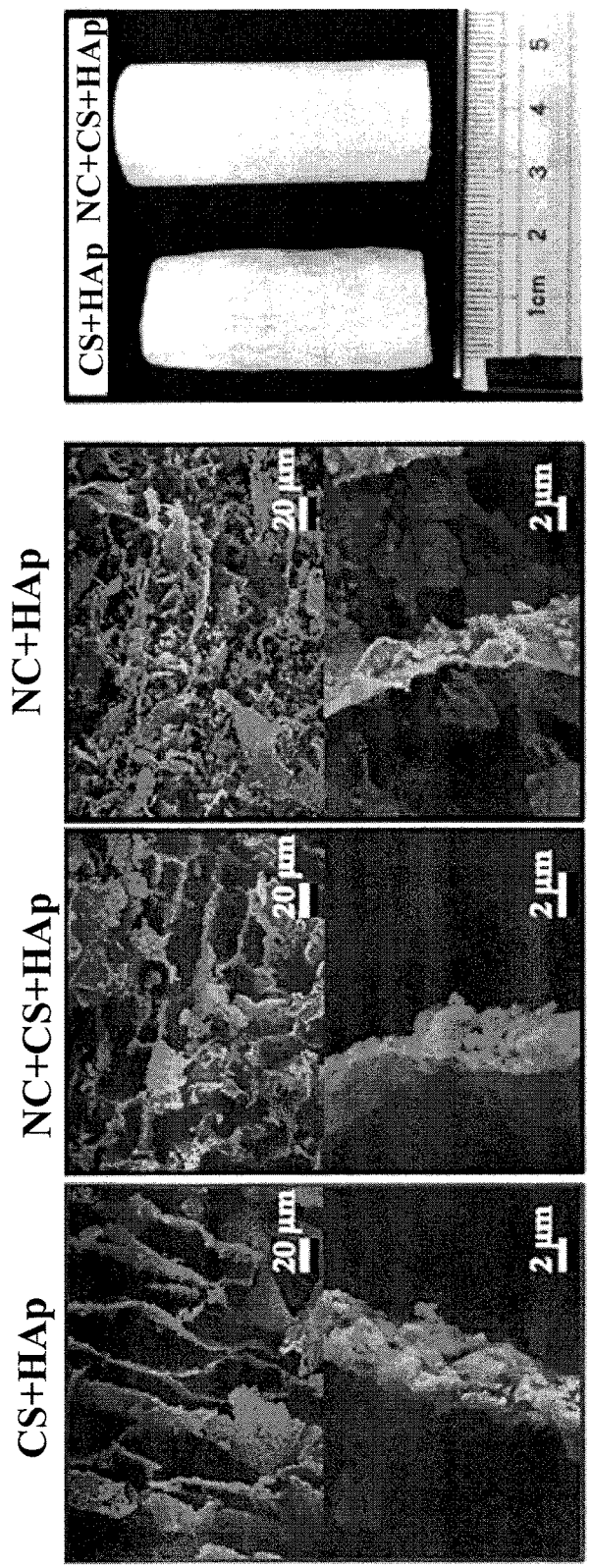
FIG. 34 are SEM images of nanocellulo se-reinforced composites in an embodiment.
Figure 35:
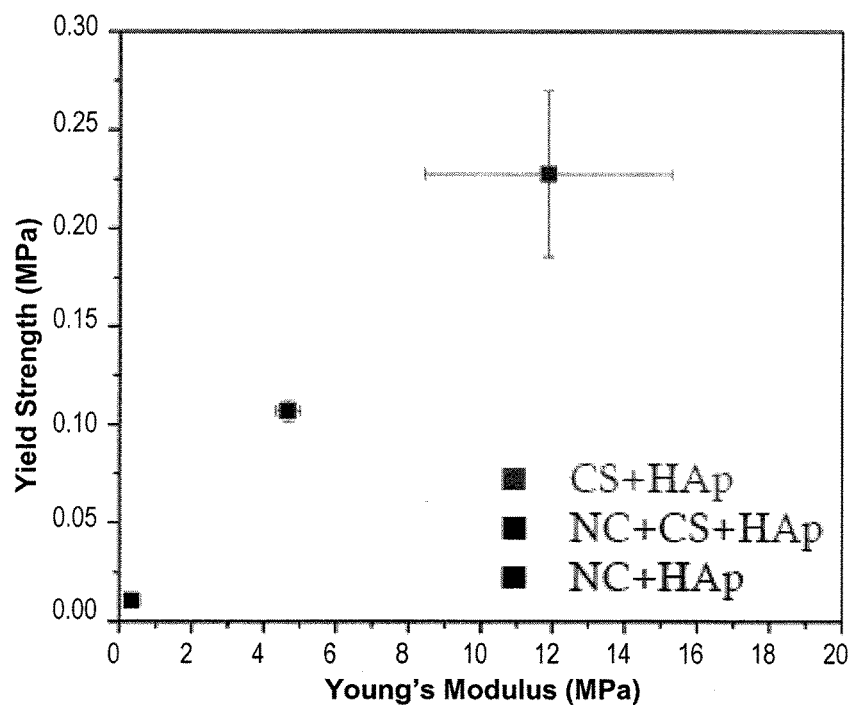
FIG. 35 illustrates yield strength vs. modulus curves for nanocellulo se-reinforced composites in an embodiment.
Figure 36:
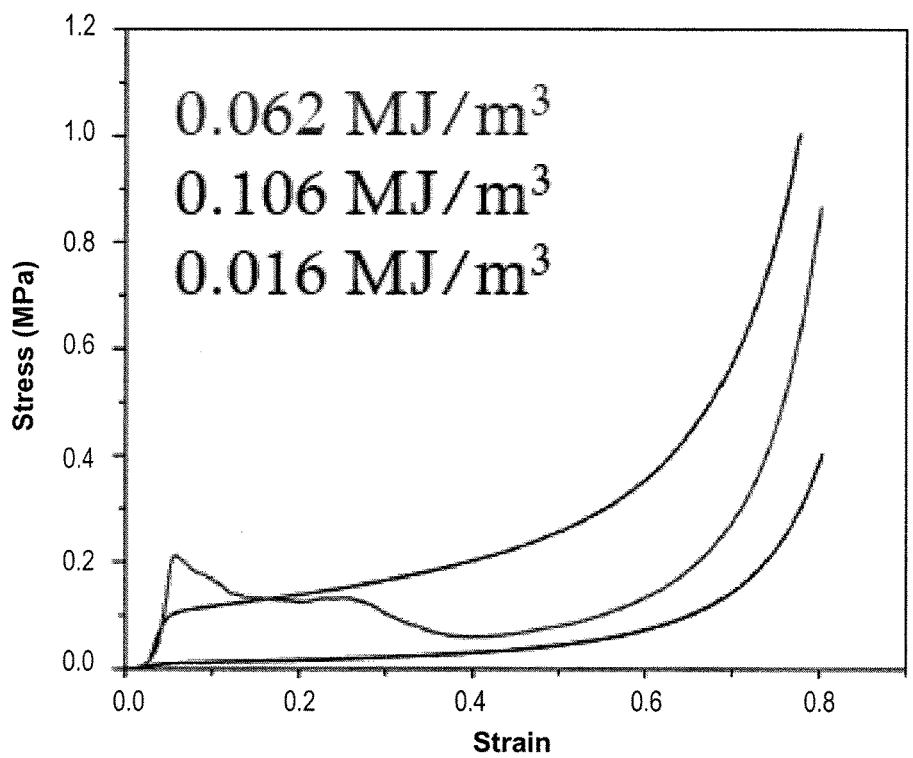
FIG. 36 illustrates stress vs. strain curves for nanocellulose-reinforced composites in an embodiment.

Four different particle compositions—platelet, small, large and bimodal—were directionally solidified at two different freezing rates of 1° C./min and 10° C./min, corresponding to freezing front velocities of 7 µm/s and 28 µm/s. After complete solidification, the scaffolds were lyophilized for 48 hrs in a FreeZone 4.5 freeze dryer (Labconco, Kansas City, Mo., USA) at a pressure of 0.02 mBar and a water trap temperature of −52° C. The freeze-dried scaffolds were cylindrical and had a diameter and height of 18 mm and 40 mm, respectively. The two freezing rates of 1° C./min and 10° C./min resulted in a lamellar spacing of 34 µm and 28 µm, respectively (FIG. 25). The overall scaffold porosity ranged from 90.2-91.8% and the composition of the cell wall solid was 75% alumina and 25% polymer by volume.

Figure 38:
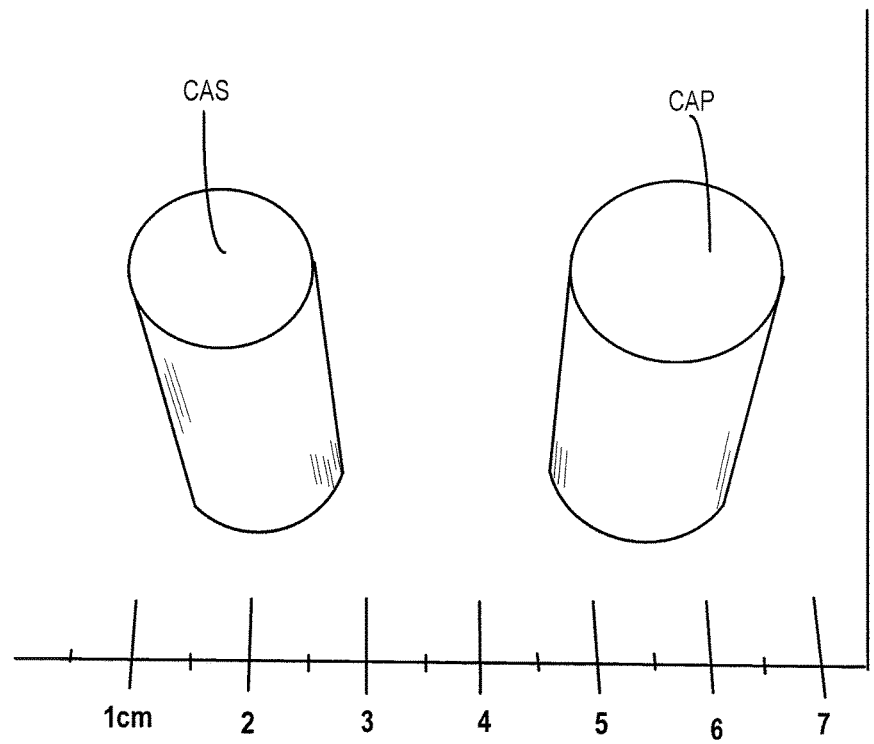
FIG. 38 illustrates CAS and CAP scaffolds CAP in an embodiment.
Figure 39:
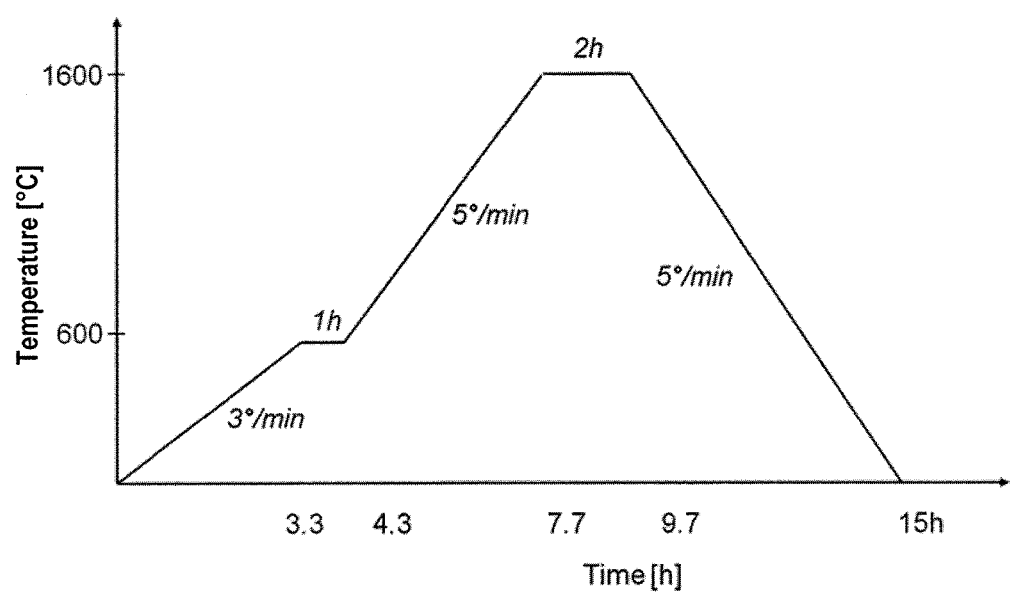
FIG. 39 shows a sintering cycle for CAS and CAP in an embodiment.

Both CAS and CAL scaffolds had about the same volumetric composition: 90% porosity, 7.6% $Al_2O_3$, and 1.5% chitosan, 0.9% gelatin. After freeze-drying, both CAS and CAP scaffolds had about the same outer diameter of 18.44 mm They were sintered at identical conditions, actually, in the very same sintering cycle. After sintering, the CAS scaffold has an outer diameter of 14.39 mm while the CAP scaffold has an outer diameter of 17.51 mm. The volumetric shrinkage for the CAS scaffold is 39% while the CAP scaffold had a volumetric shrinkage of only 10%. The linear shrinkage is 22% for small particles while for the platelets the linear shrinkage is 5%. FIG. 38 illustrates CAS and CAP scaffolds. FIG. 39 shows a sintering cycle for CAS and CAP in an embodiment.

Figure 24:
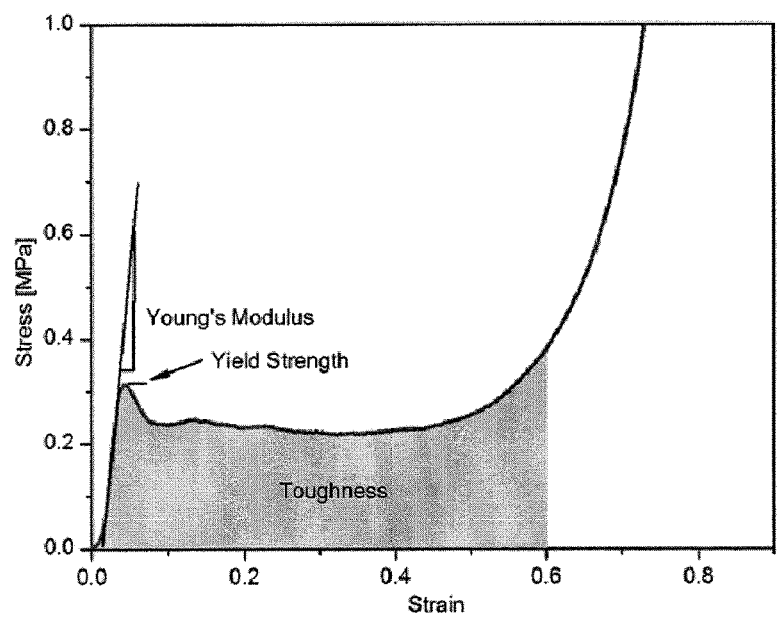
FIG. 24 is a typical stress/strain curve of the investigated hybrid scaffolds. Young's modulus was determined from the initial linear region of the curve while the yield strength was taken as the stress at which the material left the linear region and the slope of the curve changed significantly. Toughness was determined as the area under the stress-strain curve up to a strain of 60% in an embodiment.

Mechanical Testing: Four cubes with 5 mm edge length were cut with a diamond wire saw (Model 4240, WELL Diamond Wire Saws, Inc., Norcross, Ga., USA) at three different scaffold heights, 7 mm, 17.5 mm and 28 mm, measured from the scaffold bottom to the cube center, yielding 12 cubes for each scaffold. At least three cubes for each height from three different cylindrical scaffolds were tested for all four scaffold compositions. Mechanical testing was carried out in compression on a universal testing machine (Model 4442, Instron, Norwood, Mass., USA) with a 50 N load cell and a crosshead speed of 0.05 mm/s, corresponding to a strain rate of 0.01/s. A typical stress-strain curve is shown in FIG. 24. Young's modulus was calculated from the slope of the initial linear region, the yield strength was taken to be the peak stress before scaffold compaction. The toughness was calculated from the area underneath the compression curve up to a strain of 60%. The mechanical properties of the different scaffolds are listed in Tables 3 and 4.

Scanning Electron Microscopy (SEM) and Focused Ion Beam (FIB) Milling: Prior to imaging, the specimens were sputtered with platinum/palladium to achieve a coating thickness of about 3 nm. SEM micrographs were taken with an accelerating voltage of 6 kV at a working distance of 5 mm in a ZEISS Supra 50VP (Carl Zeiss SMT Inc., Peabody, Mass., USA). The cross-section of an individual cell wall, shown in FIG. 23C, was cut with a FIB system (Strata DB235, FEI Company, Hillsboro, Oreg., USA) using a beam current of 50 pA at an acceleration voltage of 30 kV. The specimens were transferred to the ZEISS Supra 50VP for imaging under the conditions described above.

In Situ Observation of Directional Solidification: Alumina platelets in chitosan-gelatin slurries were prepared as described above. Several drops of the slurry were pipetted onto a microscope slide, which was covered by a second slide to form a Hele-Shaw cell. The slides were compressed from both sides to achieve a uniform scaffold film thickness of about 100 μm. The Hele-Shaw cell was mounted horizontally in a custom-designed holder to expose the included slurry to a liquid nitrogen bath at one end of the microscope slides. Directional solidification started at this end, causing the nucleation and growth of ice crystals and the assembly of the dispersed and dissolved material, which was observed under a stereo microscope with a resolution of 476 nm (Leica M205, Leica Microsystems Inc., Buffalo Grove, Ill., USA). Videos were recorded with the Leica Application Suite and the MultiTime/Movie module.

X-ray Microtomography: Rectangular scaffolds of 1 mm×1 mm×5 mm were cut with a diamond wire saw so that the 5 mm dimension was oriented parallel to the freezing direction. The scaffold was mounted upright on a cylindrical metal holder and placed in a SkyScan 1172 high-resolution desktop micro-computed tomography system (SkyScan, Kontich, Belgium). Radiographs were taken at a voltage of 59 kV, a current of 167 μA and a pixel size of 1.47 μm. An exposure time of 2356 ms and a frame averaging of 5 was used. The rotational step size was 0.15°. The SkyScan software NRecon was used for tomographic reconstruction. Volume renderings were prepared and visualized with the Avizo® Standard software package (VSG, Visualization Science Group, Inc., Burlington, Mass., USA).

TABLE 4

Mechanical properties of the alumina composites frozen at a cooling rate of 1° C./min

| | Freezing rate 1° C./min Alumina particle type | | | |
|---|---|---|---|---|
| | Porosity [%] | Young's modulus [MPa] | Yield strength [MPa] | Toughness [MJ/m$^3$] |
| Spherical, small Ø: 400 nm | 91.4 ± 0.1 | 2.62 ± 0.75 | 0.100 ± 0.018 | 0.041 ± 0.012 |
| Spherical, biomodal 30:70 (small:large) | 90.8 ± 0.1 | 9.63 ± 1.61 | 0.244 ± 0.044 | 0.115 ± 0.031 |
| Spherical, large Ø: 10 μm | 90.5 ± 0.2 | 14.22 ± 4.36 | 0.270 ± 0.075 | 0.153 ± 0.019 |
| Platelets Ø: 5-10 μm, Thickness: 300-500 nm | 91.5 ± 0.1 | 27.44 ± 11.32 | 0.338 ± 0.057 | 0.213 ± 0.057 |

TABLE 5

Mechanical properties of the alumina composites frozen at a cooling rate of 10° C./min

| | Freezing rate 10° C./min Alumina particle type | | | |
|---|---|---|---|---|
| | Porosity [%] | Young's modulus [MPa] | Yield strength [MPa] | Toughness [MJ/m$^3$] |
| Spherical, small Ø: 400 nm | 91.8 ± 0.1 | 7.08 ± 3.53 | 0.157 ± 0.061 | 0.087 ± 0.034 |
| Spherical, biomodal 30:70 (small:large) | 90.9 ± 0.1 | 20.05 ± 2.45 | 0.346 ± 0.023 | 0.170 ± 0.025 |
| Spherical, large Ø: 10 μm | 90.2 ± 0.1 | 12.11 ± 2.41 | 0.240 ± 0.017 | 0.143 ± 0.015 |
| Platelets Ø: 5-10 μm, Thickness: 300-500 nm | 91.6 ± 0.1 | 45.14 ± 11.92 | 0.723 ± 0.081 | 0.376 ± 0.090 |

The directional solidification of a platelet-containing chitosan-gelatin solution during freeze casting causes a phase separation to occur in the platelet slurry. Lamellae of pure water-ice grow and concentrate the ceramic-polymer slurry phase when water diffuses from the polymer solution to the ice-crystal surface. This gradually increases the polymer solution's viscosity until, ultimately, it vitrifies. As a result, the particles, which are initially very mobile in the liquid polymer solution, are subjected to an increasing drag as the viscosity increases. The ice crystals continue to grow, not only in length, but also in width, while the thickness of the ceramic-polymer phase between the ice lamellae decreases until the polymer reaches its glassy state. A 9% volumetric expansion occurs when the water solidifies into ice. Because the lateral expansion of the material is constrained by the mold, the volume increase of the solid phase must result in a flow of the, at this point, still liquid or viscous composite slurry. This flow causes the platelets to align and self-assemble.

FIG. 23A illustrates schematic of platelet self-assembly between ice crystals during directional solidification. FIG. 23B illustrates ice crystals (black) grow through the slurry along the direction of the temperature gradient. The lateral growth of the ice crystals concentrates the interlamellar ceramic-polymer composite (white). Scale bars are 100 μm. FIG. 23C illustrates scanning electron micrograph of an individual composite lamella. The cross-section of the nacre-like microstructure was created with a focused ion beam (FIB) system. It reveals the high degree of alignment of the platelets. Scale bar is 5 μm. FIG. 23C illustrates mechanical performance of the nacre-like composite scaffolds. Platelet scaffolds (P) are compared with scaffolds of the same composition made from small (S), bimodal (B) or large (L) spherical particles. Freezing rates were 1° C./min (black) and 10° C./min (red).

The cell walls had the desired brick-and-mortar structure of highly aligned platelets in a polymer matrix (FIGS. 23A and 23C). When comparing the mechanical properties of the "cellular nacre" with scaffolds made from spherical particles, the Young's modulus, yield-strength and toughness of the platelet scaffolds were found to be higher by a factor of two to four (FIG. 23D). Therefore, freeze casting of platelets provides significantly improved mechanical properties than freeze casting spherical particles.

FIG. 24 is a typical stress-strain curve of a freeze-cast scaffold tested in compression, indicating how Young's modulus, yield strength and toughness were determined.

FIG. 25 shows volume rendering of the cellular structure of a typical freeze-cast platelet scaffold. X-ray microtomography data visualized with the Avizo® Standard software package. Edge length of the cube is 500 μm.

The self-assembly of platelets into the observed brick-and-mortar structure is remarkable. Based on observations of the freezing process with a high resolution light microscope, it is possible that when the slurry is cooled and ice crystals start to form, water diffuses from the polymer solution to the ice-crystal surface. This may gradually increase the polymer solution's viscosity until, ultimately, it vitrifies. As a result, the particles, which are initially very mobile in the liquid polymer solution, are subject to increasing drag as the viscosity increases. The ice crystals grow in length and width, while the thickness of the ceramic-polymer phase between the ice lamellae decreases until the polymer reaches its glassy state (FIG. 23B). Noteworthy are convection currents ahead of the freezing front. Critical for the platelet self-assembly, however, is the shear flow in the ceramic-polymer composite between the ice lamellae paralleling the direction of solidification (see video in supporting online material). This shear flow is due to the 9% volumetric expansion of the slurry when the water solidifies into ice. Because the lateral expansion of the material is constrained by the mold, the volume increase of the ice phase must result in a flow of the, at this point, still liquid or viscous composite slurry. The flow is parallel to the direction of freezing and causes the platelets to align by shear and to self-assemble.

Freeze Casting for Fast Reactor Fuels

Advanced burner reactors are designed to reduce the amount of long-lived radioactive isotopes that need to be disposed of as waste. The input feedstock for creating advanced fuel forms comes from either recycle of used light water reactor fuel or recycle of fuel from a fast burner reactor. One promising strategy to improved fuel performance is the manufacture of metal or ceramic scaffolds that are designed to allow for a well-defined placement of the fuel into a host, which permits greater control than that possible in the production of typical CERMET fuels. Embodiment are disclosed where the scaffold is not a fuel but is impregnated with fuels, and where the scaffold is a fuel and is impregnated with either a second fuel phase or a ceramic or metal structural phase.

In an embodiment, an oxide form of a nuclear fuel is placed into the metal scaffold formed as previously described as the basis of a CERMET fuel. In an alternative embodiment, a metallic fuel is placed into the metal scaffold as the basis of a metallic fuel. In another embodiment, ceramic scaffolds are formed and impregnated with an oxide fuel to form ceramic matrix fuel. In yet another embodiment, ceramic scaffolds are formed and impregnated with a metallic fuel to form an alternative structure of a metallic fuel. In particular embodiments, the impregnated scaffolds are re-sintered at a temperature suitable for sintering the impregnated fuel to solidify the fuel and prevent migration of the fuel within the scaffold.

Alumina Scaffolds Impregnated with Fuels

Figure 40:
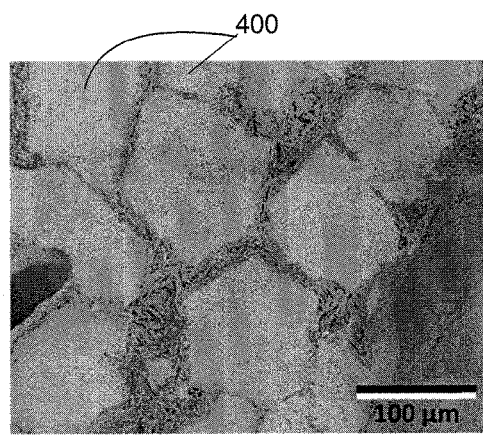
FIG. 40 is a top view cross sectional SEM illustration of pores in a ceramic (Alumina) scaffold.

In a particular experimental embodiment, directionally-porous ceramic scaffolds were formed as heretofore described from Alumina ($Al_2O_3$) and sintered at an appropriate temperature. An SEM micrograph showing pore 400 in a cut scaffold 402 is shown in FIG. 40. Sintered Al2O3 scaffolds can be easily cut while retaining their open, hexagonal pores and sustaining only minimal wall damage, and thus can be cut apart to determine locations of infiltrate. In a particular embodiment, finely divided Ceria (Cerium Oxide) was chosen as a surrogate for radioactive oxides as used in nuclear fuels.

In an embodiment, infiltration was performed by centrifuge-aided wet infiltration. Scaffold disks of 5 mm height were placed in a custom-designed sample holder for installation in a standard 25 mL centrifuge tube. After the sample holder including the sample disks were mounted in a centrifuge tube, 7 mL of ceria infiltrate slurry were carefully pipetted on top of the specimen. The infiltrate slurry composition was 75.5 wt % ceria powder (d50=0.93 μm, PIDC, Ann Arbor, Mich.), 24.1 wt % distilled water, 0.3 wt % dispersant (Darvan C-N, R.T. Vanderbilt Company, Inc., Norwalk, Conn.).

The centrifuge tubes were closed, placed in a centrifuge and spun at 40 to 200 gravities for between thirty seconds and three minutes. in a particular embodiment in a particular centrifuge at approximately 800 RPM, for 90 seconds, In an embodiment, the average pore size in the scaffold was between 10 and 25 times the particle size of the infiltrate slurry, in another embodiment the average pore size in the scaffold was 25 or more times the particle size of the infiltrate slurry.

Typical ceramic, such as alumina, scaffolds occupy 10% of total pellet volume with scaffold material, while infiltrated fuel occupies approximately 90% of pellet volume.

In an embodiment, a ceramic scaffold, which in an embodiment is a sintered alumina scaffold, is infiltrated with an Aluminum-silicon eutectic alloy (Al-12.6% Si). Other alloys anticipated include Al-12.6% Si-1% Ti) and Titanium based alloys. In particular embodiments, infiltrate metal alloys are selected such that they have the properties: Easy to wet alumina ceramic, strength and toughness, flowability, erosion reactions with the scaffold material, melting temperature; and Liquation.

Differential Pressure-Melt Infiltration of Metal Infiltrates

The scaffolds are prepared as previously described, cleaned with acetone and PRC and placed within a furnace a 998 Alumina (Coors) crucible in a furnace.

The clean alumina scaffold disc was placed at the bottom of the alumina crucible (20 mm dia.×40 mm height) and a piece of aluminum eutectic infiltrate alloy (12.6 w/o Si), previously cleaned with potassium hydroxide, was put on top of the Al scaffold disc. In an embodiment, the infiltrate alloy piece is large enough to seal the ceramic disc during melting.

The crucible assembly was located at the heating zone of the furnace and the furnace chamber was pumping down to 2×10-5 mm vacuum range. Waited until the vacuum pressure of the furnace chamber was stable and turned the furnace power on and started heating under vacuum to 950 deg. C. (the melting point of the Al eutectic alloy-577 deg C.).

The melt was held about 15 to 20 minutes to make sure all the gas entrapped inside the porous Al disc was completely escaped. Then, backfilled the furnace chamber with Argon gas to 3 psig positive pressure from 2×10−5 mm Hg vacuum. By that time, Al filler alloy was assumed to be completely sucked into the Alumina pores.

The temperature was then raised the furnace temperature to 1200 deg C. for completion of infiltration process, with resulting lowering of melt viscosity.

Then the furnace was cooling down at 50 deg. per minute under 3 psig positive argon gas pressure. Took out the sample and examined the infiltrated sample visually whether the process was successful.

Freeze Cast Metal Scaffold Infiltration with Metal Alloys

A metal scaffold is prepared as previously described. In an embodiment it is a 316L stainless steel scaffold. Infiltrate materials are selected according to wetting ability, especially to 316L SS. In a particular embodiment, silver-based filler metals were selected for filler metals because of the abundance of experimental data are already available in literatures and ready availability. (Ref-ASM Handbook, Vol. 6, page 116). Pacusil 15 (65Af-20CU-15Pd Ag alloy), Braze 655 (65Ag-28Cu-5Mn-2Ni alloy suitable for thin wall of 316L freeze cast SS), Lithobraze (self flux 71.5Ag, 28Cu-0.5Li alloy).

Since these selected alloys have high wetting index to particularly 316 SS, we had very good filling rate of filler alloy to metal scaffold.

Metal to metal erosion: Selection of filler alloy is very important that the filler alloy should not be severely reacted with freeze cast SS thin wall scaffolds during the infiltration process. Those alloys have relatively lower melting temperature compare to 316L SS, so excellence to test metal to metal infiltration.

The scaffold is placed in a Crucible; in an embodiment a Coors 998 alumina shallow disc.

Infiltration Procedure; Capillary Action Melt Infiltration.

The clean 316L SS freeze cast substrate was sit on top of alumina powder which was spread on top of shallow alumina crucible. The Ag based alloy was placed on top of the SS substrate directly. The assembly was placed at the middle of the heating zone of the furnace, and the furnace heated to 950 deg. C. to make sure the Ag alloys was completely melted under Vacuum 2×10-5 mm Hg, then backfilled the furnace chamber with 2 psig H2 gas and had continued to heat to 1100 deg. C. Hold for 8 minutes and cool down the furnace to room temperature under H2 gas.

Ceramic Scaffold Infiltration with Ceramic.

In a particular experiment, cerium nitrate (Ce(NO3)3) was infiltrated into an Alumina sintered Scaffold by melting the cerium nitrate under a vacuum in a chamber, plunging the scaffold into the melted cerium nitrate, and pressurizing the chamber with Argon.

Then the Cerium nitrate infiltrated alumina scaffold was heated to 700 deg. C. in Air to expel nitrogen and oxygen, leaving a calcined Cerium Oxide. Infiltration with cerium nitrate and heating was repeated to further fill pores.

Vacuum Infiltration.

Ce(NO3)3 is melted in alumina crucible and place into vacuum chamber. The melt is pumped it down by Mechanical roughing pump. Submerged the alumina scaffold into the nitrate melt and pressurized the chamber with Argon gas to 1 atm.

Take the infiltrated alumna scaffold and heated in air at 700 degrees C.

Zirconium Acetate Stainless Scaffolds

Stainless steel scaffolds were prepared from 316L stainless steel, with an additive of zirconium acetate during freeze-casting. The scaffolds were sintered at 1150° C. for two hours in hydrogen gas, which was found to prevent oxidation of the porous steel during sintering. In an alternative embodiment, 4% hydrogen in Argon gas was used.

The sintered steel scaffold was then infiltrated in a manner similar to infiltration as previously described for ceramic scaffolds.

Results of Neutronic Calculations

Neutronics calculations for a model breeder reactor were performed using Monte Carlo N-Particle (MCNP) code. The model used is based on the Engineering Breeder Reactor II in Idaho.

Figure 41:
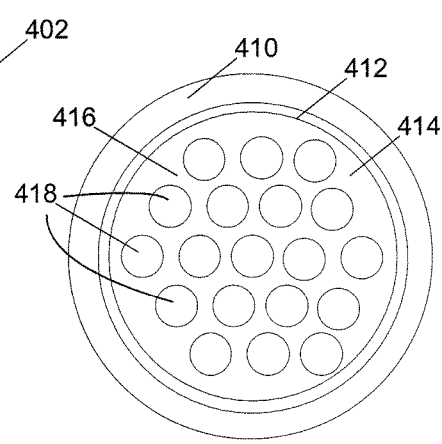
FIG. 41 is a schematic cross sectional view of an individual fuel pin, showing a scaffold and pores, such as was simulated for nucleonic analysis.

Two different fuels were tested in the simulation, a Uranium-Zirconium and a Uranium Americium-Zirconium fuel. Simulations showed criticality was reached. A reduced effective neutron multiplication factor, keff, was found when using the scaffold geometry because the scaffold itself is taking up space that would normally be solid fuel. Typical metal scaffolds occupy 30% of pellet volume, while infiltrated fuel occupies 70% of pellet volume. Fuel rod or pin structures simulated were as illustrated schematically in FIG. 41, with a cladding 410, a plenum space 412 between cladding and the fuel pellet 414, an a fuel pellet 414 having a scaffold 416 with pores 418 infiltrated with uranium in the uranium-zirconium simulation, or uranium-americium alloy in the uranium-americium simulation.

Comparison of Different Neutronics Models

Simulations compared seven models of derived from the Experimental Fast Breeder Reactor II (EBR-II) and found in the International Atomic Energy Agency's (IAEA) Fast Reactor Database. In these simulations, both space 412 and a volume between pins filled with sodium. Cladding 410 was stainless steel 316L, and fuel a 10% zirconium, 90% uranium alloy. Scaffolds simulated included 316L stainless steel, and MgO-ZrO2 ceramic scaffolds. Each scaffold material was simulated with 300, 400, and 500 micron pore sizes. A simulation was performed to determine a minimum 235 enrichment percentage within the fuel to give a K-effective of at least 1.01 in a simulated reactor. Minimum enrichment simulation results are as follows:

| Reactor Design | Minimum enrichment |
| --- | --- |
| EBR-II with stock rods | 51% |
| Ceramic 300 | 57% |
| Ceramic 400 | 57% |

| Reactor Design | Minimum enrichment |
| --- | --- |
| Ceramic 500 | 57% |
| Steel 300 | 79% |
| Steel 400 | 80% |
| Steel 500 | 79% |

In principle, of course, a reactor can be constructed with more rods and reduce these uranium enrichment percentage requirements. The higher enrichment required for stainless scaffolds is believed due to the lower volume of fuel in each pellet due to reduced porosity of stainless relative to ceramic scaffolds. Simulations of scaffolds formed of sintered uranium oxide ($UO_2$) at five and twenty percent enrichment were also performed, these simulations showed a reduced neutronic penalty over the $MgO$-$AlO_2$ ceramic.

Fuel temperature was also simulated. Maximum fuel temperatures were determined to be lower for steel scaffolds than for ceramic scaffolds because of the higher thermal conductivity of steel.

Burnup Simulations

Figure 42A:
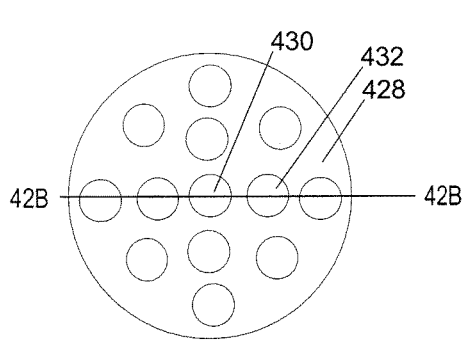
FIG. 42A is a schematic top view, and FIG. 42B a schematic cross sectional view, of an individual scaffold infiltrated selectively with different fuels.
Figure 42B:
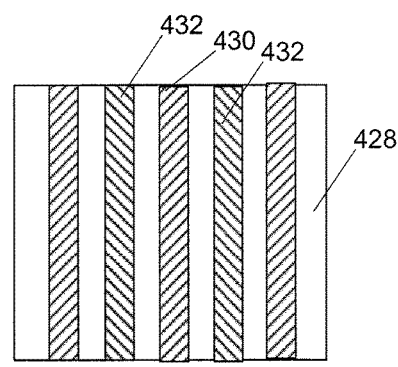

It is also anticipated that particular nuclear fuels or isotopes that it may be desirable to destroy can be positioned in particular determined groups of pores within the scaffold, as illustrated in FIG. 42A (top view) and FIG. 42B (cutaway view along the line 42B in FIG. 42A). In an embodiment, this is done by placing a mechanical mask over the scaffold, the mask having holes that admit infiltrate to particular portions of the scaffold surface, and sealing material that temporarily blocks infiltrate from other portions of the scaffold surface where infiltration by a particular infiltrate is not desired. In another an embodiment this is done by coating the scaffold top with a polymer photoresist, exposing and developing the resist to create an opening where a column of infiltrate is desired in the scaffold to form a partial fuel pellet, performing a first infiltration by placing infiltrate over the scaffold and centrifuging it, then either sintering the first infiltrate—the heat of sintering burning off the resist—or chemically stripping the resist. Once the resist is removed, the photoresist deposition and masked infiltration may be repeated if a second infiltrate is desired in other defined regions of the scaffold, or, if a particular infiltrate is desired throughout the scaffold, that infiltrate may be placed over the scaffold and centrifuged into the scaffold. In a particular embodiment, Americium is positioned as an infiltrate in defined zones 430 in the scaffold, and enriched uranium in other defined zones 432 of the scaffold.

Stainless steel is not the only metal that can be formed into a powder, bound with a binder, formed into a porous matrix by freeze-casting, lyophilized to remove water, and sintered to strengthen the matrix. For example, and not limitation, brass, bronze, gold, silver, and copper powders in binder are commonly sold as metal clays to artists, the artists form jewelry and other objects from these clays, the objects are then sintered such that they develop enough physical strength to be worn without collapsing, and to be polishable. It is expected that scaffolds can be formed from freeze-casting from such metal clays; or from a wide variety of other metals; zirconium and alloys of zirconium can also be sintered. It is also expected that scaffolds may be formed from sinterable metals such as titanium and its alloys, tantalum or its alloys, or from nickel-based superalloys.

In addition to Ceria and alumina, some other metal oxides, including zirconia ($MgO$-$ZrO2$), and some oxides of radioactive fuel elements such as uranium can also be sintered to attach particles to each other and harden dried slurry from the green state into a ceramic. It is anticipated that sinterable material useable for scaffolds includes Steel (SS316), Alumina ($Al2O3$), Ceramic ($MgO$-$ZrO2$), Silicon carbide (SiC), Zirconia ($ZrO2$), $UO2$ (5% Enriched), $UO2$ (20% Enriched), UZr metal, uranium carbide UC, plutonium oxide, or plutonium metal. In another embodiment, a thorium-containing compound is used. In particular embodiments, it is expected that Alumina and Silicon Carbide are particularly desirable as scaffold materials. These materials listed in this paragraph may also be used as an infiltrate into an alumina or silicon carbide scaffold.

Modification by Melting Scaffold

In an embodiment having an infiltrate with higher melting point than a metallic scaffold, after infiltration the scaffold is heated to above the melting point of scaffold material, but below a melting point of the infiltrate. In this embodiment, the scaffold porosity is reduced and further binds to the infiltrate.

Abrasive Elements

Freeze-cast scaffolds as heretofore described, such as may be prepared with a sintered, ductile, metallic scaffold and a sintered ceramic infiltrate. In these embodiments the infiltrate may act as an abrasive that is held in place and protected from shock and fracture by the scaffold. An embodiment having a metal scaffold with an infiltrate of sintered silicon carbide, for example, is believed to be useful as an abrasive tool; other hard ceramic infiltrates may also provide useful abrasive properties. Similarly, an embodiment with a scaffold of silicon carbide or other hard ceramic, and an infiltrate of sintered or cast metal, may have utility as an abrasive tool. Such abrasive tools may be useful for grinding or cutting metal, for drilling, for sharpening other tools, and for other purposes.

A similar structure, formed by freeze-casting and infiltration, having one hard ceramic phase, and a second metallic phase, may be useful as a cutting tool.

Bullet-Resistant Ceramic, and Ceramic-Metal Composite, Materials

In an alternative embodiment, a freeze-cast ceramic scaffold having the form of a large ceramic plate of approximately 11 by 12 inches by about one-half inch thick is formed of sintered aluminum oxide, boron carbide, silicon carbide, glass, aluminum oxynitride, or a mixture thereof, and thereupon infiltrated with metals, such as titanium, or polymers. The plate is expected to have bullet-resistant properties and may be useful as armor; in a particular embodiment as a rifle-resistant plate in class-III or class-IV body-armor.

Other Applications

While the neutronic simulations described above have been performed with reference to breeder and burner reactors, it is anticipated that scaffolds as herein described, infiltrated with appropriate fuels, are applicable to light-water reactors also.

It is also anticipated that a freeze-cast scaffold formed from glass may be impregnated with nuclear waste for burial. In particular it is anticipated that the scaffold may be selectively impregnated with high level waste in a center of the scaffold, and other materials in a periphery of the scaffold, to retard leaching of the waste during long term storage.

Sinterable tantalum can also be formed into a freeze-cast scaffold. It is anticipated that porous freeze-cast tantalum may have usefulness as an electrode material in capacitors for electronic applications.

A freeze-cast scaffold may also be formed of alumina or other ceramic platelets with an epoxy binder, with an epoxy binder the sintering step is not necessary.

A freeze-cast scaffold may be infiltrated with magnetic nanoparticles, or with sinterable magnetic material, permitting construction of an intriguing variety of magnetic devices.

A freeze-cast scaffold as herein described may also be infiltrated with electrically conductive materials including nanowires, conductive nanoparticles, metals and/or polymers.

A freeze-cast scaffold similar to that herein described may be made of metal particles in a polymeric binder, such as an epoxy. With an epoxy binder, sintering of the scaffold may not be required for applications where the infiltrate is in a polymer binder or otherwise does not require sintering.

During fabrication of the freeze-cast scaffold, it has been found that certain additives to the slurry, including zirconium acetate or antifreeze proteins, alter the pattern of pores. In particular, zirconium acetate has been found to encourage formation of a honeycomb-like regular array of uniformly-sized pores.

Having described several embodiments, it would be recognized by those skilled in the art that various modifications, alternative constructions, and equivalents may be used without departing from the spirit of the invention. Additionally, a number of well-known processes and elements have not been described in order to avoid unnecessarily obscuring of the present invention. Accordingly, the above description should not be taken as limiting the scope of the invention.

Figure 43:
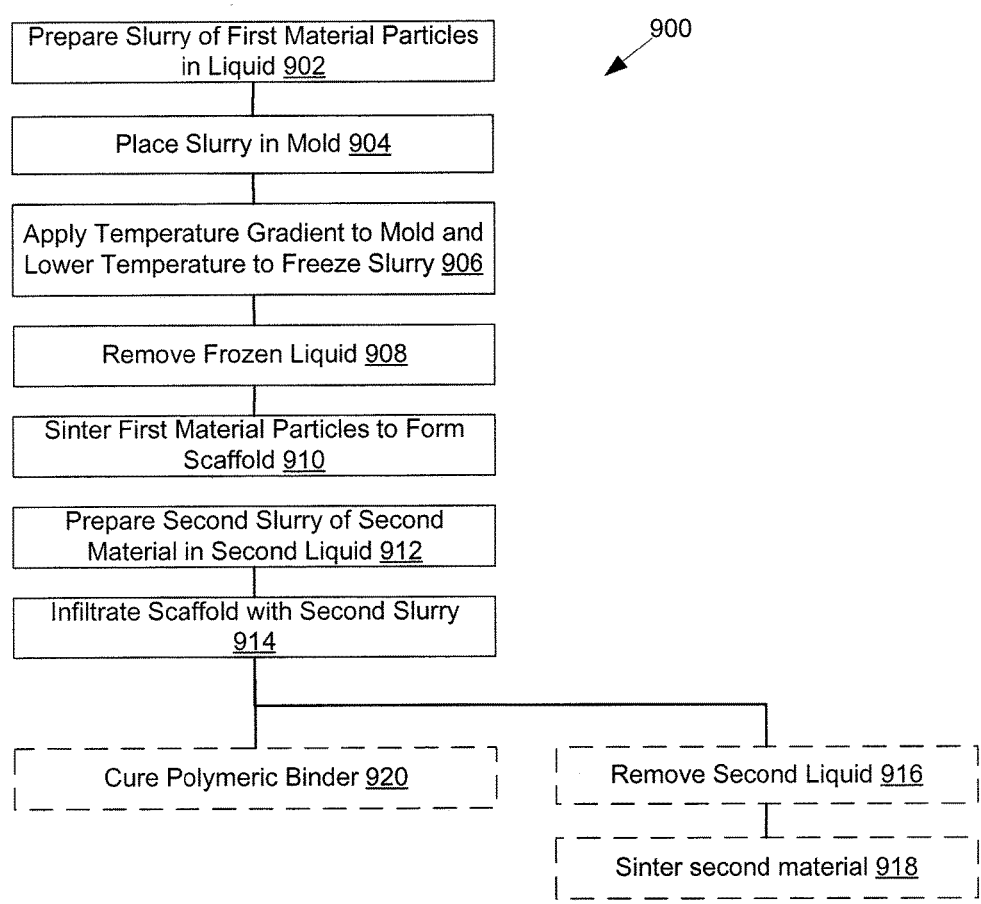
FIG. 43 is a summary flowchart of the method of manufacture of the composite materials, and composite reactor fuels, described herein.

The method 900 of making the composite material and/or reactor fuel described herein is summarized in FIG. 43. The method begins by preparing 902 a slurry of first material particles in a liquid, the liquid in most embodiments is water, and may contain additional substances such as the chitosan described above in the section "Slurry" above. The slurry is poured 904 into a mold having a desired shape. In embodiments the slurry includes metal particles that in particular embodiments include stainless steel particles with sizes equal to or smaller than 3 µm. The slurry in embodiments includes a polymer binder incorporating chitosan, gelatin, and ethanol. In an alternative embodiment, the polymer binder has a zirconium acetate additive.

The temperature gradient is applied 906 to the slurry to control anisotropic crystal formation, and slurry temperature is lowered below a freezing point of the liquid. In an embodiment, the gradient is applied and temperature lowered by placing the mold onto a copper cold finger having a second end that is submerged in a bath of liquid nitrogen, as the slurry freezes anisotropic crystals form and displace the first material into spaces between crystals, forming a scaffold of the first material having aligned pores filled with crystalized frozen liquid. The frozen liquid is then removed 908, in an embodiment by freeze-drying. The scaffold of first material is then sintered 910.

A second slurry is then prepared 912, with second particulate material in a second liquid, the second particulate material is the infiltrate material. The second liquid may, but need not, also be water with additives to help keep the second particulate material suspended, and in an alternative embodiment the second liquid includes a polymeric binder. The second slurry is then infiltrated 914 into the scaffold of first material to form a composite material.

In embodiments, the second liquid is removed 916, in a particular embodiment by freeze-drying, and the second particulate material is sintered 918 to form a final composite. In alternative embodiments, the polymer the presently disclosed instrumentalities teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A metal/metal-oxide composite, comprising:
   sintered metal particles forming a scaffold, the scaffold having at least one region of aligned porosity with a gradient; and
   a metal-oxide ceramic material disposed in pores of the scaffold.

2. The metal/metal-oxide composite of claim 1 wherein the metal-oxide ceramic material comprises a nuclear fuel comprising uranium oxide.

3. The metal/metal-oxide composite of claim 1 where the metal is stainless steel.

* * * * *